US006952436B2

(12) United States Patent
Wirnsberger et al.

(10) Patent No.: US 6,952,436 B2
(45) Date of Patent: Oct. 4, 2005

(54) INORGANIC/BLOCK COPOLYMER-DYE COMPOSITES AND DYE DOPED MESOPOROUS MATERIALS FOR OPTICAL AND SENSING APPLICATIONS

(75) Inventors: Gernot Wirnsberger, Graz (AT); Brian J. Scott, Goleta, CA (US); Howard C. Huang, Oakland Gardens, NY (US); Nicholas A. Melosh, Pasadena, CA (US); Peidong Yang, Berkeley, CA (US); Bradley F. Chmelka, Goleta, CA (US); Galen D. Stucky, Goleta, CA (US)

(73) Assignee: Regents of the University of California, Oakland, CA (US)

( * ) Notice: Subject to any disclaimer, the term of this patent is extended or adjusted under 35 U.S.C. 154(b) by 600 days.

(21) Appl. No.: 10/002,968

(22) Filed: Nov. 14, 2001

(65) Prior Publication Data

US 2002/0065366 A1 May 30, 2002

Related U.S. Application Data

(60) Provisional application No. 60/248,871, filed on Nov. 14, 2000.

(51) Int. Cl.$^7$ ................................................. H01S 3/00
(52) U.S. Cl. ........................................................ 372/39
(58) Field of Search .......................... 372/39, 6; 525/88; 252/582–589, 301.16

(56) References Cited

U.S. PATENT DOCUMENTS

| 6,270,846 B1 | 8/2001 | Brinker et al. | |
| 6,592,764 B1 | 7/2003 | Brinker et al. | 210/660 |
| 2002/0032272 A1 * | 3/2002 | Sievers et al. | 524/501 |

FOREIGN PATENT DOCUMENTS

DE   P4225952.5   2/1994

OTHER PUBLICATIONS

Ryoo, R.; Ko, C.H.; Cho, S.J.; Kim, J.M. *J Phys. Chem. B* 1997,101,10610.
Zhao, D.; Yang, P.; Melosh, N.; Feng, J.; Chmelka, B.F.; Stucky, G.D. *Adv. Mater.* 1998, 10, 1380.
Melosh, N.A.; Lipic, P.; Bates, F.S.; Wudl, F.; Stucky, G.D.; Fredrickson, G.H.; Chmelka, B.F. *Macromolecules* 1999, 32, 4332.
Yang, P.; Deng, T.; Zhao, D.; Feng, P.; Pine, D.; Chmelka, B.F.; Whitesides, G.M.; Stucky, G.D. *Science* 1998, 282, 2244; Zhao, D.; et al. Adv. Mater.
Huang, M.H.; Dunn, B.S.; Soyez, H., Zink, J.I. *Langmuir* 1998, 14, 7331.
Honma, I.; Zhou, H.S.; Chem. Mater. 1998, 10, 103.
Dag, O.; Ozin, G.A.; Yang, H.; Reber, C.; Bussiere, G. *Adv. Mater.* 1999,11, 474.
Yang, P. et al., *Science*, 2000, XX, XX.
D. Zhao, et al., *Science*, 279, 548 (1998).
Zhao, D. et al., *J. Am. Chem. Soc.*, 1998, 120 6024.
Schaudel, B.; Guermeur, C.; Sanchez, C.; Nakatami, K.; Delaire, J.A., *J. Mater. Chem.* 1997, 7, 61.
Vlasov, Yu.A.; Luterova, K.; Pelant, I.; Hdnerlage, B.; Astratov, V.N.; *Appl. Phys. Lett*; 1997, 71, 1616.
McGehee, M.D.; Gupta, R.; Veenstra, S.; Miller, K.E.; Diaz–Garcia, M.A.; Heeger, AJ, *J. Phys. Rev. B*, 1998, 58, 7035.
Gupta, R.; Stevenson, M.; Dogariu, A.; McGehee, M.D.; Park, J.Y.; Srdanov, V.; Heeger, A.J.; Wang, H. *Appl. Phys. Lett.* 1998, 73, 3492.
Berggren, A.; Dodabalapur, A.; Slusher, R.E.; *Appl. Phys. Lett.* 1997, 71, 2230.
Zhou, H.S.; Sasabe, H.; Honma, I.; *J Mater. Chem.* 1998, 8, 515.
Gupta, R. et al., *Appl. Phys. Lett.*, 1998, 73, 3492.
Berggren, A.; et al., *Appl. Phys. Lett.*, 1997, 71, 2230.
Lebeau, B.; Sanchez, C. Current Opinion in Solid State and Materials Science 1999, 4, (no month).
Dunn B.; Zink, J. Chem. Mater. 1997, 9, 2280 (no month).
Qian, S.–X.; Snow, J.B.; Tzeng, H.–M.; Chang, R.K. Science 1986, 231, 486 (no month).
Yanagi, H.; Hishiki, T.; Tobitani, T.; Otombo, A.; Mashiko, S. Chem. Phys. Lett. 1998.
Rahn, M.D.; King, T.A. Appl. Opt. 1995, 34, 8260.
Zink, J.I.; Dunn, B.; Kaner, R.B.; Knobbe, E.T.; McKiernan, J. ACS Symp. Ser. 1991.
Bekiari, V.; Pistolis, G.; Lianos, P. J. Non–cryst. Solids 1998, 226, 200.
Grattan, K.T.V.; Badini, G.E.; Palmer, A.W.; Tseung, A.C.C. Sensors and Actuators.
Lobnik, A.; Oehme, I.; Markovic, I.; Wolfbeis, O.S. Anal. Chim. Acta 1998, 367, 159.
Ben–David, O.; Shafir, E.; Gilath, I.; Prior, Y.; Avnir, D. Chem. Mater. 1997, 9, 2255.
McEvoy, A.K.; McDonagh, C.; MacCraith, B.D. J. Sol–Gel Sci. Techn. 1997, 8, 1121.
McDonagh, C.; MacCraith, B.D.; McEvoy, A.K. Anal. Chem. 1998, 70, 45.
Bunker, B.C.; Rieke, P.C.; Tarasevich, B.J.; Campbell, A.A.; Fryxell, G.E.; Graft, G.L.; Song, L.; Liu, J.; Virden, J.W.; McVay, G.L. Science 1994, 264, 48.

(Continued)

*Primary Examiner*—Quyen Leung
(74) *Attorney, Agent, or Firm*—Fulbright & Jaworski

(57) ABSTRACT

A method for preparing transparent mesostructured inorganic/block-copolymer composites or inorganic porous solids containing optically responsive species with selective optical, optoelectronic, and sensing properties resulting therefrom. Mesoscopically organized inorganic/block copolymer composites doped with dyes or complexes are prepared for use as optical hosts, chemical/physical/biological sensors, photochromic materials, optical waveguides, tunable solid-state lasers, or optoelectronic devices. The materials can be processed into a variety of different shapes, such as films, fibers, monoliths, for novel optical and sensing applications.

83 Claims, 18 Drawing Sheets

OTHER PUBLICATIONS

Sayari, A. *Chem. Mater.* 1996, 8, 1840.

Corma, A. *Chem. Rev.* 1997, 97, 2373.

Ryoo, R.; Ko, C.H., Cho, S.J., Kim J.M., *J. Phys. Chem. B*, 1997, 101, 10610.

Yang, P.; Zhao, D.; Chmelka, B.F.; Stucky, G.D. *Chem. Mater.* 1998, 10, 2013.

Göltner, C., Henke, S., Weissenberger, M.C., Antonietti, M., *Angew. Chem., Int Ed. Engl.*, 1998, 37, 613.

Melosh, N.A.; Davidson, P.; Chmelka, B.F. *J. Am. Chem. Soc.* 2000, 122, 823.

Yang, P.; Wirnsberger, G.; Huang, H.C.; Cordero, S.R.; Scott, B; McGehee, M.D.; Deng, T.; Whitesides, G.M.; Chmelka, B.F.; Buratto, S.K.; Stucky, G.D. *Science* 2000, 287, 465.

Marlow, F.; McGehee, M.D.; Zhao, D.; Chmelka, B.F.; and Stucky, G.D. *Adv. Mater.* 1999, 11, 632.

Zhou, H.S.; Honma, I. *Adv. Mater.* 1999, 11, 683.

Lebeau, B.; Fowler, C.E.; Hall, S.R., Mann S. *J. Mater. Chem.* 1999, 9, 2279.

Yanagi, H.; Hishiki, T.; Tobitani, T.; Otomo, A.; Mashiko, S. *Chem. Phys. Lett.* 1998, 292,332.

Deshpande, A.; Namdas, E.B. *Chem. Phys. Lett.* 1996, 263, 449.

Zink, J.I.; Dunn, B.; Kaner, R.B.; Knobbe, E.T.; McKiernan, J. ACS *Sym. Ser.* 1991, 455,541.

Rottman, C.; Grader, G.; Hazan, Y.D.; Melchior, S.; Avnir, D. *J Am. Chem. Soc.* 1999, 121, 8533.

Huo, Q.; Margolese, D.I.; Stucky, G.D. *Chem. Mater.* 1996, 8, 1147.

Bagshaw, S.A.; Prouzet, E.; Pinnavaia, T.J. *Science* 1995, 269, 1242.

Xia, Y.; Whitesides, G.M. Ann. *Rev. Mater. Sci.* 1998, 28,153.

Xia, Y.; Rogers, J.A.; Paul, K.E.; Whitesides, G.M. *Chem. Rev.* 1999, 99, 1823.

Bruinsma, P.J.; Kim, A.Y.; Liu, J.; Baskaran, S. *Chem. Mater.* 1997, 9, 2507.

Lu, Y.; Ganguli, R.; Drewien, C.A.; Anderson, M.T.; Brinker, C.J.; Gong, W.; Guo, Y.; Soyez, H.; Dunn. B.; Huang, M.H.; Zink, J.1. *Nature* 1997, 389, 364.

Tolbert, S.H.; Schaffer, T.E.; Feng, J.; Hansma, P.K.; Stucky, G.D. *Chem. Mater.* 1997, 9, 1962.

Aksay, I.A.; Trau, M.; Manne, S.; Honma, I.; Yao, N.; Zhou, L.; Fenter, P.; Eisenberger, P.M.

Fowler, C.F.; Lebeau, B.; Mann, S. *Chem. Commun.* 1998, 1825–1826 (no month).

Avnir, D.; Levy, D.; Reisfeld, R. *J Phys. Chem.* 1984, 88, 5956–5959, no month.

Kamada, K.; Sasaki, K.; Misawa, H.; Kitamura, N.; Masuhara, H. *Chem. Phys. Lett.* 1993, 210, 89 (Jul. 1993) p. 89–93.

Huo, Q.; Marg–Jese, D.I.; Ciesla, U.; Demuth, D.G.; Feng, P.; Gier, T.E.; Sieger, P.; Firouzi, A.; Chmelka, B.F.; Schueth, F.; Stucky, G.D. *Chem. Mater.* 1994, 6, 1176 (no month).

Ryoo, R.; Ko, C.H.; Cho, S.J.; Kim, J.M. *J Phys. Chem. B* 1997,101,10610 no month.

Huang, M.H.; Dunn, B.S.; Soyez, H.; Zink, J.I. *Langmuir* 1998, 14, 7331 no month.

Wu, J.; Gross, A.F.; Tolbert, S.H. *J Phys. Chem. B* 1999, 103, 2374 no month.

Zhao, D. et al.,*J. Am. Chem. Soc.*, 1998, 120 6024 no month.

Y. Xia, et al., *Angew. Chem. Int. Ed.* 37, 551 (1998) pp. 551–575 (no month).

Hungerford, G.; Suhling, K.; Ferreira, J.A., *J. Photochem. Photobiology* 1999, 129, 71 (no month) pp. 71–80.

Keller, S.L.; Boltenhagen, P.; Pine, D.J.; Zasadzinski, J.A. *The American Physical Society* 1998, 80, 12, 2725 (pp. 2725–2728) Mar. 1998.

Gupta, R.; Stevenson, M.; Dogariu, A.; McGehee, M.D.; Park, J.Y.; Srdanov, V.; Heeger, A.J.; Wang, H. *Appl. Phys. Lett.* 1998, 73, 3492–3494, Dec. 1998.

Ganschow, M.; Wöhrle, D.; Schulz–Ekloff, G. J *Porphyrins Phthalocyanins* 1999, 3, 299 no month.

Rahn, M.D.; King, T.A.; *Appl. Opt.* 1995, 34, 8260 pp 8260–8271 (Dec. 1995).

Marlow, Frank; Zhao, Dongyuan; Stucky, Galen D.; Doped Mesoporous Silica Fibers: The Internal Structure; Microporous and Mesoporous Materials 39 (2000) 37–42 (no month).

Yang, Piedong, et al; Mirrorless Lasing from Mesostructured Waveguides Patterned by Soft Lithography; Science, vol. 287, Jan. 12, 2000, pp. 44–46.

Zhao, Dongyuan; et al.; Triblock Copolymer Syntheses of Mesoporous Silica with Periodic 50 to 300 Angstrom Pores; Science, vol. 279; Jan. 23, 1998; pp. 548–552.

\* cited by examiner a b a b 1,3-Dihydro-1,3,3-trimethylspiro[2H-indole-2,3'-[3H]naphth[2,1-b][1,4]oxazine]

Optical Limiting in Porphyrin-Doped Composites

0 wt% F127, [TPP] = 2 x10$^{-3}$ Molar

50 wt% F127

60 wt% F127

~2 mm

Damage Thresholds
498 mJ/cm^2 per pulse at 532nm 0 wt% F127

50 wt% F127

60 wt% F127

— 20 nm

— 50 nm a b

INORGANIC/BLOCK COPOLYMER-DYE COMPOSITES AND DYE DOPED MESOPOROUS MATERIALS FOR OPTICAL AND SENSING APPLICATIONS

CROSS-REFERENCE WITH RELATED APPLICATIONS

This application claims the benefit of U.S. Provisional Application No. 60/248,871, filed Nov. 14, 2000.

STATEMENT REGARDING FEDERALLY SPONSORED RESEARCH AND DEVELOPMENT

This invention was made with Government support under Grant. Nos. DMR-9632716 and CTS-9871970, awarded by the National Science Foundation, and under Grant No. DAAH04-96-1-0443, awarded by the U. S. Army. The Government has certain rights in this invention.

FIELD OF THE INVENTION

The field of the invention is transparent solids having optical and sensing properties.

BACKGROUND OF THE INVENTION

Until now, optically transparent, dye-doped solids have been in the form of large crystals, inorganic glasses, and polymers. For reviews of inorganic glasses, see, e.g.: a.) *Struct. Bond* 1996, 85 (complete volume); b) Lebeau, B.; Sanchez, C. *Current Opinion in Solid State and Materials Science* 1999, 4, 11; c) Dunn B.; Zink, J. *Chem. Mater.* 1997, 9, 2280; d) Avnir, D. *Acc. Chem. Res.* 1995, 28, 328. For polymers, see, e.g: Qian, S.-X.; Snow, J. B.; Tzeng, H.-M.; Chang, R. K. *Science* 1986, 231, 486. In each of these systems, there are limitations to the incorporation of optically responsive compounds or other property restrictions that constrain their utility for device applications. For example, the inclusion of optically responsive agents in crystalline solids is limited to low concentrations, because of disruptions to the crystalline lattices. In glasses, aggregation of dye species occurs at relatively low dye-doping levels (above~0.5 wt %) to produce undesirable opacity or high excitation thresholds for lasing or amplified spontaneous emission. See, e.g: Yanagi, H.; Hishiki, T.; Tobitani, T.; Otombo, A.; Mashiko, S. *Chem. Phys. Lett.* 1998, 292, 332. Polymeric systems are frequently limited by relatively low thermal or mechanical stabilities, especially with regard to the photostability of the incorporated dye (e.g., the decomposition of the dye under light illumination), which is crucial to long term device reliability and operation. See Rahn, M. D.; King, T. A. *Appl. Opt.* 1995, 34, 8260.

Because of the favorable properties of sol-gel glasses in terms of processing and dye photostability compared to polymeric host systems, substantial efforts have been undertaken to characterize the properties of the included dye species and to optimize syntheses for optical applications. The spectroscopic properties of such dye-host materials are mainly determined by the local dye environment, which can be used to probe local dye interactions with the host matrix. Numerous dye-doped sol-gel-derived glasses with different compositions and prepared under different processing conditions (pH, solvent used, sol-gel aging time) have been investigated. See Struct. Bond, supra; Lebeau, B.; Sanchez, C., supra; Dunn B.; Zink, J., supra; and Avnir, D. Acc., supra. Two primary means by which the spectroscopic properties of such materials can be modified are through changes in the composition of the host matrix or through the selection of different optically responsive species. One example is the use of organically modified silicate systems (so-called ORMOSILS), instead of an entirely inorganic oxide matrix, to prepare organic-dye-doped systems with enhanced photostabilities. See, e.g.: Zink, J. I.; Dunn, B.; Kaner, R. B.; Knobbe, E. T.; McKiernan, J. ACS Symp. Ser. 1991, 398, 541. A second example is the incorporation of rare earth complexes as luminescent species in composites of sol-gel glasses and organic polymers to reduce non-radiative quenching by $H_2O$ or inorganic hydroxyl groups, thereby enhancing quantum efficiencies and light emission. See Bekiari, V.; Pistolis, G.; Lianos, P. J. Non-cryst. Solids 1998, 226, 200. Local dye environments are crucially important to the optical properties of dye-doped solids and it would be desirable to be able to adjust such nanoscopic structural and compositional features with greater control and efficiency.

Dye-doped sol-gel-derived glasses have been important in the development of optical materials exhibiting lasing or amplified spontaneous emission (ASE) properties and in the development of optically based sensors. Lasing and amplified spontaneous emission have been demonstrated in such systems processed as monoliths and as thin films. For monoliths, see Zink, J. I. et al, supra, and e.g.: Salin, F.; Le Saux, G.; Georges, P.; Brun, A.; Bagnall, C.; Zarzycki, J. *Opt. Lett.* 1989, 14, 785. For thin films, see Yanagi, H., et al, supra. However, the thresholds for both kinds of superlinear optical input-output behavior tend to be undesirably high, due to relatively low dye solubilities and low quantum efficiencies (as discussed in more detail below). Such systems have nevertheless been used to develop optically based sensors for acidity, oxygen gas, and heavy metal detection. See, e.g: pH sensing : Grattan, K. T. V.; Badini, G. E.; Palmer, A. W.; Tseung, A. C. C. *Sensors and Actuators* 1991, 25–27, 483; Lobnik, A.; Oehme, I.; Markovic, I.; Wolfbeis, O. S. *Anal. Chim. Acta* 1998, 367, 159; Ben-David, O.; Shafir, E.; Gilath, I.; Prior, Y.; Avnir, D. *Chem. Mater.* 1997, 9, 2255; Rottman, C.; Ottolenghi, M.; Zusman, R.; Lev, O.; Smith, M.; Gong, G.; Kagan, M. L.; Avnir, D. *Mater. Lett.* 1992, 13, 293; Yang, L.; Saavedra, S. S. *Anal. Chem.* 1995, 67, 1307; oxygen sensing: McEvoy, A. K.; McDonagh, C.; MacCraith, B. D. *J. Sol-Gel Sci. Techn.* 1997, 8, 1121; McDonagh, C.; MacCraith, B. D.; McEvoy, A. K. *Anal. Chem.* 1998, 70, 45; heavy metal sensing: Iosefzon-Kuyavskaya, B.; Gigozin, I.; Ottolenghi, M.; Avnir, D.; Lev, O. *J. Non-cryst. Solids* 1992, 147&148, 808.

While good long-term stabilities and processabilities of dye-doped inorganic glasses or ORMOSIL materials are attractive for sensing applications, a major drawback is their relatively long response times. This is due to the dense homogeneous material structures in which the optically responsive species are encapsulated that slow diffusive transport of target molecular species to the optically responsive sensing sites within the material. The best sensing response times reported for dye-doped inorganic glasses or ORMOSIL are slow: ~5 s for oxygen sensing with ruthenium complexes or ~20 s for pH sensing using fluorescein-derivatives.

Recently, the use of self-assembling surfactant species to organize inorganic networks has provided opportunities to produce inorganic/organic composites and mesoporous solids with high degrees of mesoscopic order. So far, interest in these materials, which can have large surface areas of up to ~1400 $m^2/g$ (after oxidation/extraction of the surfactant species,) has been confined mainly to catalysis and separation applications, because they have been prepared predominantly as powders. See Bunker, B. C.; Rieke, P. C.;

Tarasevich, B. J.; Campell, A. A.; Fryxell, G. E.; Graff, G. L.; Song, L.; Liu, J.; Virden, J. W.; McVay, G. L. *Science* 1994, 264, 48; Sayari, A. *Chem. Mater.* 1996, 8, 1840; and Corma, A. *Chem. Rev.* 1997, 97, 2373. However, based on recent processing advancements, transparent mesostructured/mesoporous systems have been prepared. See Ryoo, R.; Ko, C. H., Cho, S. J., Kim J. M., *J. Phys. Chem. B*, 1997, 101, 10610; Huo, Q.; Zhao, D.; Feng, J.; Weston, K.; Buratto, S. K.; Stucky, G. D.; Schacht, S.; Schueth, F. *Adv. Mater.* 1997, 9, 974; Zhao, D.; Yang, P.; Melosh, N.; Feng, J.; Chmelka, B. F.; Stucky, G. D. *Adv. Mater.* 1998, 10, 1380; Yang, P.; Zhao, D.; Chmelka, B. F.; Stucky, G. D. *Chem. Mater.* 1998, 10, 2013; Goeltner, C., Henke, S., Weissenberger, M. C., Antonietti, M., *Angew. Chem., Int Ed. Engl.,* 1998, 37, 613; Melosh, N. A.; Lipic, P.; Bates, F. S.; Wudl, F.; Stucky, G. D.; Fredrickson, G. H.; Chmelka, B. F. *Macromolecules* 1999, 32, 4332; Melosh, N. A.; Davidson, P.; Chmelka, B. F. *J. Am. Chem. Soc.* 2000, 122, 823; and Yang, P.; Wirnsberger, G.; Huang, H. C.; Cordero, S. R.; Scott, B; McGehee, M. D.; Deng, T.; Whitesides, G. M.; Chmelka, B. F.; Buratto, S. K.; Stucky, G. D. *Science* 2000, 287, 465.

Optical functionalities have been introduced into such structures. See Yang, P. et al, supra, Marlow, F.; McGehee, M. D.; Zhao, D.; Chmelka, B. F.; and Stucky, G. D. *Adv. Mater.* 1999, 11, 632. Such functionalities can be introduced using surfactants with optical functionalities, reactive oxide/surfactant interfaces for the assembly of silicon clusters, or the covalent anchoring of dyes in small-pore thin films and monoliths. For surfactants, see Zhou, H. S.; Honma, I. *Adv. Mater.* 1999, 11, 683. For oxide/surfactant interfaces, see: Dag, O.; Ozin, G. A.; Yang, H.; Reber, C.; Bussiere, G. *Adv. Mater.* 1999, 11, 474. For covalent anchoring, see Lebeau, B.; Fowler, C. E.; Hall, S. R., Mann S. *J. Mater. Chem.* 1999, 9, 2279; and Fowler, C. F.; Lebeau, B.; Mann, S. *Chem. Commun.* 1998, 1825.

Thus far, however, no optical or sensing applications of these materials have been demonstrated, beyond amplified spontaneous emission (ASE) from small unit-cell mesostructured micron-size particles (grown by two-phase synthesis) and ASE in patterned thin films. [Marlow, F. et al, supra, and Yang, P., et al, supra.] Additionally, the successful removal of the surfactant, simultaneously maintaining both mesostructural order and optical transparency, has until now not been demonstrated. Distinct advantages of mesostructured/mesoporous materials over the prior art for several applications will be shown and discussed below.

Mesostructured/mesoporous materials have attracted a great deal of interest as potential catalysts and separation media, because of their large pore dimensions and volumes and high internal surface areas. See, Yanagiswa, T.; Shimizu, T.; Kuroda, K.; Kato, C. *Bull. Chem. Soc. Jpn.* 1990, 63, 988; Kresge, C. T.; Leonowicz, M. E.; Roth, W. J.; Vartuli, J. C.; Beck, J. S. *Nature,* 1992, 359, 710; Beck, J. S.; Vartull, J. C.; Roth, W. J.; Leonowicz, M. E.; Kresge, C. T.; Schmitt, K. D.; Chu, C. T.-W.; Olson, D. H.; Sheppard, E. W.; McCullen, S. B.; Higgins, J. B.; Schlenker, J. L. *J. Am. Chem. Soc.* 1992, 114, 10834; Bunker, B. C.; Rieke, P. C.; Tarasevich, B T; Campell, A. A.; Fryxell, G. E.; Graff, G. L.; Song, L.; Liu, J.; Virden, J. W.; McVay, G. L. *Science,* 1994, 264, 48; Sayari, A. *Chem. Mater.* 1996, 8, 1840; and Corma, A. *Chem. Rev.* 1997, 97, 2373.

As indicated above, interesting application possibilities exist for mesoscopically ordered composites as optical materials, particularly as host media for molecules and complexes exhibiting optical functionalities. [Huo, Q.; Zhao, D.; Feng, J.; Weston, K.; Buratto, S. K.; Stucky, G. D.; Schacht, S.; Schüth, F. *Adv. Mater.* 1997, 9, 974.] Such materials, with symmetric and adjustable mesoscopic structures and compositions, offer new opportunities for controlling the local environments of occluded dye molecules. Until now, dye inclusion has been mainly restricted to either incorporation in pure oxides or polymeric hosts. For oxides, see e.g., Avnir, D.; Levy, D.; Reisfeld, R. *J Phys. Chem.* 1984, 88, 5956; Salin, F.; Le Saux, G.; Georges, P.; Brun, A.; Bagnall, C.; Zarzycki, J. *Opt. Lett.* 1989, 14, 78; McKiernan, J. M.; Yamanaka, S. A.; Dunn, B.; Zink, J. I. *J Phys. Chem.* 1990, 94, 5652; and Yanagi, H.; Hishiki, T.; Tobitani, T.; Otomo, A.; Mashiko, S. *Chem. Phys. Lett.* 1998, 292,332. For polymeric hosts, see e.g., Deshpande, A.; Namdas, E. B. *Chem. Phys. Lett.* 1996, 263, 449; Kuwata-Gonokami, M.; Takeda, K.; Yasuda, H.; Ema, K. *Jpn. J. Appl. Phys.* 1992,31, L99; Taniguchi, H.; Yamada, H.; Fujiwara, T.; Tanosaki, S.; Ito, H.; Morozumi, H.; Baba, M. *Jpn. J. Appl. Phys.* 1993, 32, L59; and Kamada, K.; Sasaki, K.; Misawa, H.; Kitamura, N.; Masuhara, H. *Chem. Phys. Lett.* 1993, 210, 89.] An exception, as indicated above, is the occlusion of dyes in ORMOSILs, which have been shown to allow structural tuning of the local dye environment to a certain degree. However, such dye-doped ORMOSIL materials show no evidence of crystalline or mesoscopic ordering, as measured by X-ray or electron diffraction [Zink, J. I.; Dunn, B.; Kaner, R. B.; Knobbe, E. T.; McKiernan, J. ACS *Sym. Ser.* 1991, 455,541; and Knobbe, E. T.; Dunn, B.; Fuqua, P. D.; Nishida, F. *Appl. Opt.* 1990, 29, 2729.] Very recently, sol-gel glasses have also been doped with surfactants and their use has been shown to influence substantially the spectroscopic properties of simultaneously occluded dye molecules. [Rottman, C.; Grader, G.; Hazan, Y. D.; Melchior, S.; Avnir, D. *J Am. Chem. Soc.* 1999, 121, 8533.]

The degree of control over dye molecule environments and other advantages (such as increased photostability of occluded dye species), is expected to be significantly enhanced in dye-doped mesostructured composites. Furthermore, it is likely that new synergistic effects might result from surfactant/dye co-assembly into mesoscopically ordered structures. The use of differently charged surfactants (non-ionic, cationic, anionic) and the possibility of preparing structures under basic, neutral, or acidic conditions offers versatile synthesis and processing conditions that can be used to tailor materials to desired properties. See, Behrens, P. Angew. *Chem. Int. Ed. Engl.* 1996, 35, 515; Huo, Q.; Margolese, D. I.; Stucky, G. D. *Chem. Mater.* 1996, 8, 1147; Huo, Q.; Margolese, D. I.; Ciesla, U.; Feng, P.; Gier, T. E.; Sieger, P.; Leon, R.; Petroff, P. M.; Schueth, F.; Stucky, G. D. *Nature* 1994, 368, 317; Huo, Q.; Marg-Jese, D. I.; Ciesla, U.; Demuth, D. G.; Feng, P.; Gier, T. E.; Sieger, P.; Firouzi, A.; Chmelka, B. F.; Schueth, F.; Stucky, G. D. *Chem. Mater.* 1994, 6, 1176; and Bagshaw, S. A.; Prouzet, E.; Pinnavaia, T. J. *Science* 1995, 269, 1242.

Silica mesostructured materials synthesized under acidic conditions, below the pH 2 isoelectric point of silica have proved to be particularly promising [Huo, Q.; Nature; and Zhao, D.; *Science*] in that they can be rapidly processed into different morphologies (fibers, films, monoliths) and hierachically ordered structures patterned by soft-lithography. For reviews of soft-lithographic patterning, see Xia, Y.; Whitesides, G. M. Ann. *Rev. Mater. Sci.* 1998, 28,153; Xia, Y.; Rogers, J. A.; Paul, K. E.; Whitesides, G. M. *Chem. Rev.* 1999, 99, 1823. For fibers, see Huo, Q.; Zhao, D., et al, supra; Yang, P.; Zhao, D., et al, supra; and Bruinsma, P. J.; Kim, A. Y.; Liu, J.; Baskaran, S. *Chem. Mater.* 1997, 9, 2507. For thin films, see Lu, Y.; Ganguli, R.; Drewien, C. A.; Anderson, M. T.; Brinker, C. J.; Gong, W.; Guo, Y.; Soyez, H.; Dunn, B.; Huang, M. H.; Zink, J. I. *Nature* 1997, 389, 364; Tolbert, S. H.; Schaffer, T. E.; Feng, J.; Hansma, P. K.; Stucky, G. D. *Chem. Mater.* 1997, 9, 1962; Aksay, I. A.; Trau, M.; Manne, S.; Honma, I.; Yao, N.; Zhou, L.; Fenter, P.; Eisenberger, P. M.; Gruner, S. M. *Science* 1996, 273, 892; Yang, H.; Kupernan, A.; Coombs, N.; Mamiche-Afara, S.; Ozin, G. A. *Nature* 1996, 379, 703; Ryoo, R.; Ko, C. H.; Cho, S. J.; Kim, J. M. *J Phys. Chem. B* 1997,101,10610; and Zhao, D.; Yang, P.; Melosh, N.; Feng, J.; Chmelka, B. F.; Stucky, G. D. *Adv. Mater.* 1998, 10, 1380. For monoliths, see Melosh, N. A.; Lipic, P.; Bates, F. S.; Wudl, F.; Stucky, G. D.; Fredrickson, G. H.; Chmelka, B. F. *Macromolecules* 1999, 32, 4332; and Goeltner, C., Henke, S., et al, supra. For hierachically ordered structures, see Yang, P.; Deng, T.; Zhao, D.; Feng, P.; Pine, D.; Chmelka, B. F.; Whitesides, G. M.; Stucky, G. D. *Science* 1998, 282, 2244; Zhao, D.; et al. Adv. Mater. (meso/macroporous membranes). Synthesis conditions can moreover be adapted to allow such materials to be prepared over a wide range of inorganic framework compositions and mesoscopic structures to tailor the properties of these complex heterogeneous multicomponent systems. [Yang, P.; Deng, T., et al, supra; and Huang, M. H.; Dunn, B. S.; Soyez, H.; Zink, J. I. *Langmuir* 1998, 14, 7331.

Whereas the first incorporation of dye molecules into mesostructured materials was aimed at in situ monitoring of mesostructure formation during processing [Lu, Y., et al, supra; and Zhou, H. S.; Honma, I., et al, supra], recent efforts have been directed toward the goal of obtaining dye-doped structures for optical applications. [Honma, I.; Zhou, H. S.; Chem. Mater. 1998, 10, 103.] Quite different approaches have been used, ranging from the incorporation of phthalo-cyanins with the help of specifically designed surfactants, [Wu, J.; Gross, A. F.; Tolbert, S. H. *J Phys. Chem. B* 1999, 103, 2374] or insertion of polymers into MCM-41-type materials after surfactant extraction, [Dag, O.; Ozin, G. A.; Yang, H.; Reber, C.; Bussiere, G. *Adv. Mater.* 1999,11, 474] to the generation of photoluminescent silicon clusters on the walls of as-synthesized SBA-3 films. [Yang, P.; Wirnsberger, G., et al, supra.] We have recently reported the development of patterned waveguide arrays formed from rhodamine-6G-doped mesostructured silica using poly(ethyleneoxide)-b-(poly(propyleneoxide)-b-poly(ethyleneoxide) amphiphilic triblock copolymer surfactant species [specifically, $(EO)_{20}(PO)_{70}(EO)_{20}$, abbreviated P123]. [Yang, P. et al., *Science*, 2000, XX, XX.] Rhodamine-6G (R6G)-doped mesostructured silica composites were formed into long nonintersecting line patterns by using soft lithography.

Here, we disclose and characterize mesostructured inorganic-organic composite and porous inorganic materials for optical and sensing applications. Such materials have several important advantages and properties including unique adjustability of material composition, structure, macroscopic morphologies, and orientational ordering. This permits substantial improvements (e.g., lower lasing thresholds, higher photostabilities, and superior mechanical and thermal stabilities) over the existing state-of-the-art in several areas, including waveguides, lasers, optical limiters, optical switches and interconnects, optical amplifiers, and sensing devices.

SUMMARY OF THE INVENTION

The present invention provides a method for preparing a mesostructured inorganic/organic hybrid or mesostructured inorganic solids for optical and sensing applications. Key features of the materials are that they can be prepared sufficiently free of defects to be transparent, while providing selective optical absorption and emission characteristics and the structures resulting therefrom.

One embodiment of the present invention is a method of forming an optically responsive mesostructured material by direct dye doping. A self-assembling system is prepared by dissolving an inorganic precursor, a self-assembling block copolymer, and an optically responsive agent in a solvent, and polymerizing the inorganic precursor species to form a mesostructured composite. This method can include the further step of removing the block copolymer species from the composite by calcination or extraction to form a mesoporous material.

Another embodiment of the present invention is a method of forming an optically responsive mesostructured material by anchoring the dye to an inorganic framework. In this method a derivatized dye molecule is formed by anchoring a dye molecule to an organo-alkoxysilane. A self-assembling system is then prepared by dissolving an inorganic precursor, a self-assembling block copolymer, and the derivatized dye molecule in a solvent. The inorganic precursor species are subsequently polymerized or crystallized to form a mesostructured inorganic/block copolymer composite.

Yet another embodiment of the present invention is a method of forming an optically responsive mesoscopically ordered porous material, wherein inorganic precursor species and a self-assembling block copolymer are dissolved in a solvent, the precursor species are polymerized or crystallized to form a mesostructured inorganic/block copolymer composite, and the block copolymer species are removed from the composite to form a mesoporous material. The optically responsive agent is subsequently introduced into the mesoporous material.

The inorganic precursor is preferably a metal alkoxide or organo-metal precursor, such as tetraethoxysilane (TEOS), tetramethoxysilane (TMOS), and tetrapropoxysilane (TPOS), most preferably TEOS, but may also include transition metal compounds, organo-metals, organoalkoxysilanes, and mixtures thereof.

The block copolymer can be any self-assembling architecture, but is preferably an amphiphilic triblock copolymer, such as a poly(ethylene oxide)-poly(alkylene oxide)-poly (ethylene oxide) polymer, where the central alkylene oxide moiety has at least three carbon atoms. Most preferably the triblock copolymer is poly(ethyleneoxide)-poly(propyleneoxide)-poly(ethyleneoxide).

The optically responsive agents can include, but are not restricted to, organic dyes, such as rhodamine, fluoroscein, porphyrin, spirooxazine, conjugated organic molecules, organometallic molecules, charge transfer complexes, rare-earth species, and their derivatives. More particularly the optically responsive agent is rhodamine 6G, fluoroscein isothiocyanate, fluoroscein isothiocyanate derivatized with 3-aminopropyltriethoxysilane, tetraphenylporphyrin, or ruthenium trisbipyridine.

The optically responsive mesostructured material can be further processed by applying a one or more layers of the mesostructured material to a substrate by dip-coating, spin-coating, or forming molded patterns by soft lithography.

The materials produced by the foregoing methods include: (a) composites comprising an inorganic or organically functionalized inorganic framework, a block copolymer and an optically responsive agent; (b) a mesoporous inorganic or organically functionalized inorganic framework having an optically responsive agent covalently anchored to the framework; or (c) a mesoporous inorganic or organically functionalized inorganic framework having an optically responsive agent adsorbed on or included in the framework.

These materials may be combined with non-mesostructured materials that insulate, produce a barrier (e.g., for protection or to modify permeability), or modify the refractive index of the material interfaces.

These materials can be used as a component of a solid-state sensor device comprising a substrate layer and a sensing layer, where the sensing layer is one of the optically responsive mesoporous materials of the present invention. For example, a pH sensor can be made wherein the optically responsive agent of the sensing layer is fluoroscein. In another example, the device is an oxygen sensor where the optically actic agent in the sensing layer is $Ru(bipy)_3^{3+}$.

In addition, the optically responsive materials of the present invention can be used to make laser devices, in which feedback is incorporated into the device to produce amplification and coherence. Such lasers can be prepared by dip-coating, spin-coating, forming molded patterns by soft lithography, or ink-jet printing on substrates. Examples include a microring-type laser, where an optical fiber is coated with one or more layers of mesostructured materials. In preferred embodiments, such laser devices include one or more mesostructured support layers coating the optical fiber, one or more optically responsive layers coating the support layer(s), and one or more mesostructured layers deposited on the optically responsive layer(s). The compositions and structures of the mesostructured layers can be selected to modify transport (e.g., permeability) and optical (e.g., refractive index) properties of the layers and device.

In addition, the optically responsive mesostructured materials of the present invention can be used to make a waveguide device, where a mesoporous support layer is deposited on a substrate, and a waveguide pattern of an optically responsive mesostructured material is molded on the support layer. Preferably, the refractive index of the optically responsive material is greater than that of the support layer.

Mesoscopically organized inorganic/block copolymer composites are outstanding materials for optical applications, especially when transparent and derivatized or doped with dyes, conjugated organic molecules, organometallic complexes, or rare-earth species. This includes, but is not limited to, their use as lasers, materials for amplified spontaneous emission, hosts for photochromic dyes that allow fast optical switching, optical sensors, and waveguides. The nanophase separation in these materials enables high dye doping concentrations by enhancing dye dispersion through improved solubility, including reduced dye aggregation or complexation. Moreover, nanophase separation allows a rational adjustment of the local dye nanoenvironments. Also, the porous forms of these materials, derived by low-temperature block-copolymer extraction or high temperature calcination are excellent materials for sensing applications when doped with organic dyes, conjugated organic molecules, inorganic complexes, or rare-earth species. Examples include pH and oxygen sensing, and it is shown that the responses of these sensors are much faster than that of conventional sol-gel glasses doped with the same dyes or complexes. Importantly, the materials can also be processed into a variety of different shapes useful for optical applications, including films, fibers, monoliths, and coatings on film or fibers substrates.

DETAILED DESCRIPTION

I. General Purpose or Utility

Figure 1:
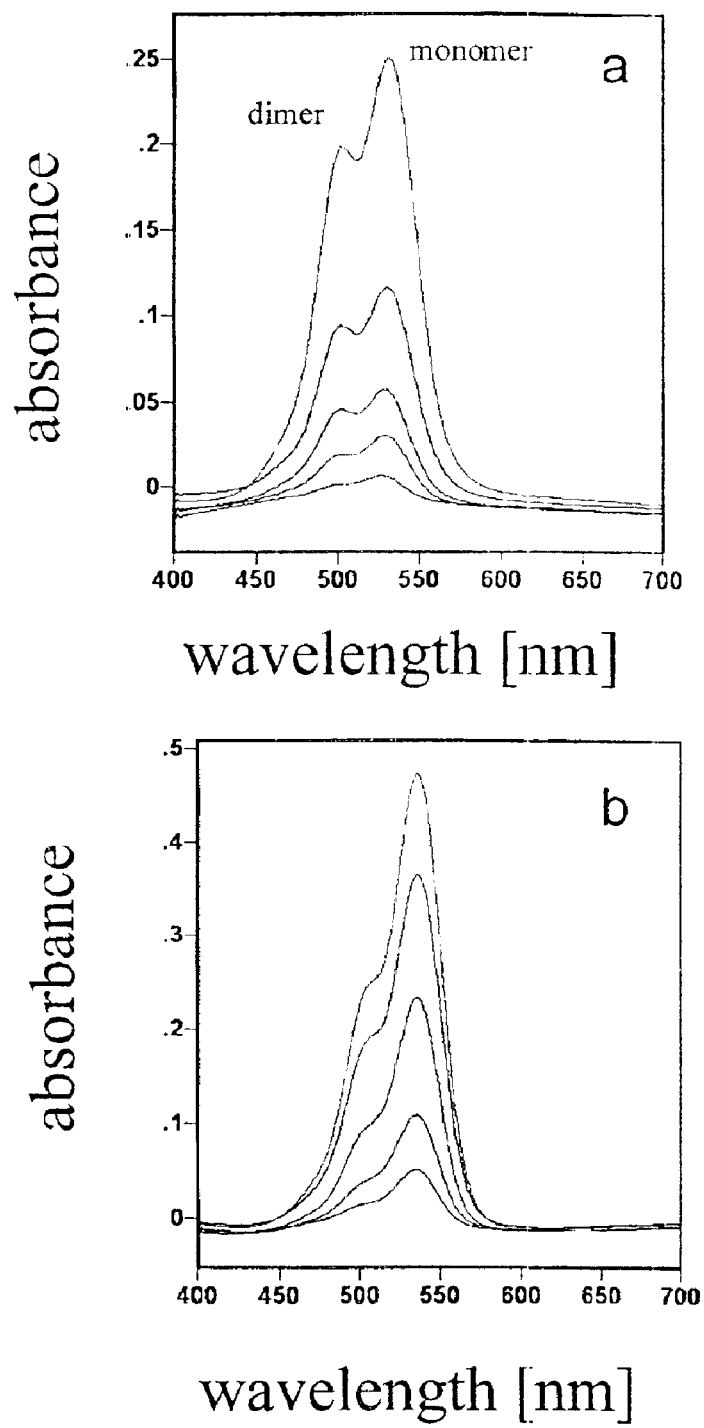
FIG. 1 shows UV/Vis spectra of rhodamine-6G-doped thin films in a) sol-gel glasses, and b) mesostructured silica thin films prepared with an amphiphilic poly (ethyleneoxide)-poly(propyleneoxide)-poly(ethyleneoxide) triblock copolymer, specifically $(EO)_{20}(PO)_{70}(EO)_{20}$ (P123)

The use of as-synthesized mesostructured materials as host media for dye or optically responsive molecules offers a new route to optical materials with advantageous characteristics, including low-threshold lasing, optical limiting, and ultrasensitive chemical and biological detection properties. These materials are useful as waveguides, laser materials, optical switches and interconnects, optical amplifiers, delay generators and sensors, as well as in other optical applications. Furthermore, the attractive processability of inorganic-block copolymer composites permits straightforward engineering of the materials into a variety of macroscopic shapes, including films, fibers, and monoliths. Inexpensive, easy, and fast preparations should make these materials suitable for large-scale production of optical components. Extensions of these materials for optical applications obvious to those skilled in the art include the incorporation of semiconductors, nanometer-sized clusters, and rare earth complexes in transparent inorganic/block copolymer mesophase composites or mesoporous solids.

II. Technical Description

The present application is directed to an efficient preparation of inorganic/block copolymer/dye composites and dye-doped mesoporous materials. These materials are prepared by combining a self-assembling block copolymer species (preferably, but not necessarily amphiphilic block copolymers) with inorganic precursor species, (preferably, but not necessarily, by creating an acidic sol-gel solution). The block copolymer species act as structure-directing agents for the inorganic precursor species, which polymerize or crystallize into a network with meso- and/or macroscopic order imparted by the self-assembled block copolymer species. Optically responsive functionalities can be introduced by incorporating optically responsive molecules into the block copolymer/inorganic composites or mesoporous solids during synthesis or by post-synthesis modification.

Preferred inorganic precursor species, include tetraethoxysilane (TEOS), tetramethoxysilane (TMOS), tetrapropoxysilane (TPOS), or organically modified derivatives, which are suitable sources of silica for the preparation of mesoporous silica structures. The inorganic species can also include: metal alkoxides; metal halides; metal oxides, such as $Nb_2O_5$, $TiO_2$, $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, $Al_2TiO_5$. The metal precursors may include any of the main group, transition metals, and rare-earth metals and mixtures thereof. "Transition metal", as used herein, refers to an element designated in the Periodic Table as belonging to Group IIIB (e.g., scandium and yttrium), Group IVB (e.g., titanium, zirconium and hafnium), Group VB (e.g. chromium, molybdenum and tungsten), Group VIIB (e.g., manganese, technitium and rhenium), Group VIIIB (iron, ruthenium, osmium, cobalt, rhodium, iridium, nickel, palladium and platinum), Group IB (e.g., copper, gold and silver) and Group IIB (zinc, cadmium and mercury).

Commercially available, low-cost, non-toxic, and biodegradable amphiphilic poly(alkylene oxide) block polymers can be used as the structure-directing agents in solutions for organizing the network-forming metal compound species. Preferably the block copolymer is a triblock copolymer in which a hydrophilic poly(alkylene oxide), such as polyethylene oxide ($EO_x$), is linearly covalent with the opposite ends of a hydrophobic poly(alkylene oxide), such as poly (propylene oxide) ($PO_y$), or a diblock polymer in which, for example, poly(ethylene oxide) is linearly covalent with poly(butylene oxide) ($BO_y$). This can variously be designated as follows:

poly(ethylene oxide)-poly(propylene oxide)-poly (ethylene oxide)

$HO(CH_2CH_2O)_x(CH_2CH(CH_3)O)_y(CH_2CH_2O)_xH$ $EO_xPO_yEO_x$ or poly(ethylene oxide)-poly(butylene oxide)-poly(ethylene oxide)

$HO(CH_2CH_2O)_x(CH_2CH(CH_3CH_2)O)_yH$

PEO-PBO-PEO $EO_xBO_yEO_x$ where x is 5 or greater and y is 30 or greater, with no theoretical upper limit to either value subject to practical considerations. Block copolymers with different architectures, molecular weight, or concentrations have been used to obtain ordered structures, for example, hexagonal, lamellar, or cubic phases, with ordering length scales between about 5 nm to 20 nm. Larger ordering length scales are possible when higher molecular weight copolymer blocks, larger emulsion droplets, or larger colloidal particles are used.

Preparation of a precursor solution was outlined in D. Zhao, et al., Science, 279, 548 (1998) and Zhao, et al., Adv. Mater., 10, 1380 (1998). Tetraethoxysilane (TEOS), tetramethoxysilane (TMOS), and tetrapropoxysilane (TPOS) were suitable sources of silica for the preparation of mesoporous silica structures. Oligomeric silica sol-gel precursor species were obtained by pre-hydrolysis of TEOS in ethanol by an acid catalyzed reaction Hexagonal mesoporous silica structures were formed in acid media (pH<1) with HCl, HBr, HI, $HNO_3$, $H_2SO_4$, or $H_3PO_4$ acids. In Zhao, et al., Adv. Mater, 10, the oligomeric silica sol-gel was then added into a mixture of poly(ethylene oxide)-poly(propylene oxide)-poly(ethylene oxide) PEO-PPO-PEO triblock copolymers or alkyl poly(ethylene oxide) and inorganic metal precursor compound in water and ethanol. The final composition of this mixture was (in molar ratio) 0.0068–0.034 $EO_{20}PO_{70}EO_{20}$ triblock copolymer:0.51 to about 3.0 inorganic metal compound:1 tetraethylorthoxysilane (TEOS) :11–50 ethanol (EtOH):0.002–0.04 HCl:18–65 $H_2O$.

Besides ethanol, other organic solvents, such as methanol, 1,4-dioxane, tetrahydrofuran (THF), $CH_3CN$, and propanol, can be used.

To produce mesoporous materials, the block copolymer species can be removed from the inorganic/organic composite by calcination or solvent extraction treatments. For example, calcination in air or oxygen at temperatures from 140 C to 500 C, depending on time and material morphology, has been used to oxidize the block copolymer species, resulting in mesoporous solids [Zhao, D. et al., J. Am. Chem. Soc., 1998, 120 6024]. Alternatively, the block copolymer species can be removed by reflux extraction using a suitable solvent, such as ethanol [Zhao, D. et al., J. Am. Chem. Soc., 1998, 120 6024].

As defined herein, an optically responsive agent is a substance which absorbs and/or emits lights, or changes intensity, polarization, or color in response to some stimulus, e.g. transmitted light or a change in pH or oxidation state. Optically responsive agents can be incorporated as soluble low-molecular-weight dye species, as surfactant species containing molecular dye functionalities, as dyes covalently anchored to the inorganic network, as ionic species, or as adsorbed species introduced after block copolymer extraction/calcination. Preferred optically responsive agents include fluorscein, rhodamine, spirooxazine, porphyrin, conjugated organics, organometallic/charge transfer complexes, rare-earth species and their derivatives. More preferably, the optically responsive agent is fluoroscein isothiocyanate, fluoroscien isothyocyanate derivatized with 3-aminopropyl triethoxysilane, rhodamine 6G, tetraphenylporphyrin or ruthenium tris-bipyridine.

The optically responsive agent is generally present in the self-assembling precursor solution at a concentration of about 0.1 wt % to about 10 wt %; preferably about 0.25 wt % to about 5 wt %; more preferably at greater than about 0.5 wt %, and most preferably at greater than about 1 wt %.

The macroscopic form of the material is determined by the processing conditions employed, which can be modified to yield transparent bulk monoliths, films formed by spray-, dip- or spin-coating [Zhao, D.; Yang, P., et al, supra], ink-jet printing, soft lithographic patterning [Yang, P.; Wirnsberger, G., et al, supra ], microfibers [Zhou, H. S.; Honma, I., et al, supra], drawn fibers [Yang, P.; Zhao, D., et al, supra ], and coatings.

Macroscopic structures are prepared by combining concurrently or sequentially the techniques of micromolding, dip- or spin-coating and cooperative self-assembly of hydrolyzed inorganic species and amphiphilic block copolymers. The mold used in the following examples was a poly (dimethylsiloxane) (PDMS) mold. The procedure for making the mold is outlined in Y. Xia, et al., *Angew. Chem. Int. Ed.* 37, 550 (1998). The patterned structures of the resulting materials can have a thicknesses from submicron to microns, depending on the relief depth of the micromold used. One skilled in the art may practice the invention using any mold having micron scale features.

The substrate used in the following examples was a freshly cleaned silicon wafer. Extensions to other conducting, semiconducting, or insulating substrates, such as doped silicon, glass, quartz, and polymers, may be considered obvious to those skilled in the art.

The important new features of these materials are the combination of novel optical, sensing, mechanical, thermal, morphological, and processing properties that result from the incorporation of optically responsive agents into transparent nano/mesophase-separated inorganic/block-copolymer composites or transparent nano/mesostructured inorganic solids.

By incorporating such optical functionalities into hybrid inorganic/organic nano/mesophase heterogeneities, aggregation of dye species is significantly reduced, leading to high dye dispersions and, thus, the incorporation of higher dye concentrations. As a consequence, significantly lower thresholds are observed for both amplified spontaneous emission and lasing, compared to prior art materials, such as sol-gel-derived glasses, which have been so far the predominant host materials used for dispersion and isolation of dye molecules in solid-state matrices. This is clearly evidenced by the much higher quantum yields for rhodamine 6G when incorporated in mesostructured $SiO_2$/block copolymer composites, compared to sol-gel-derived glasses (up to one order of magnitude). Also, when preparing rhodamine-6G-doped glasses by starting from the same precursor solutions without block-copolymer surfactant species, UV/Vis (ultraviolet/visible) spectroscopy indicates a much higher concentration of dimers in the final solid products. As shown in FIG. 1(*a*), a UV/Vis band is observed at 490 nm corresponding to the dimer species [Hungerford, G.; Suhling, K.; Ferreira, J. A., *J. Photochem. Photobiology* 1999, 129, 71], which is of much lower intensity relative to the monomer, than in dye-doped sol-gel glasses. This favorable effect can be used to produce a very-low-threshold laser material [Zhao, D.; Yang, P., et al, supra]. FIG. 1(*b*) shows UV/Vis spectra for transparent mesostructured/P123 composites containing R6G in different concentrations.

Figure 2:
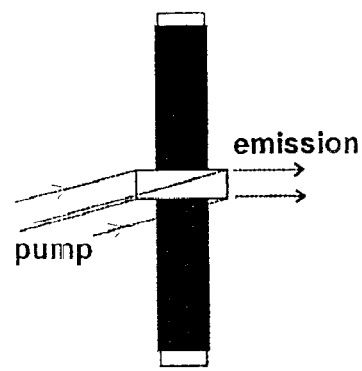
FIG. 2 shows a) the configuration for the optical excitation and detection of optical emission from a rhodamine-6G-doped mesostructured silica/P123 block copolymer thin film deposited on a mesoporous silica coating, which is itself deposited on an optical fiber, and b) amplified spontaneous emission above the threshold.
Figure 2:
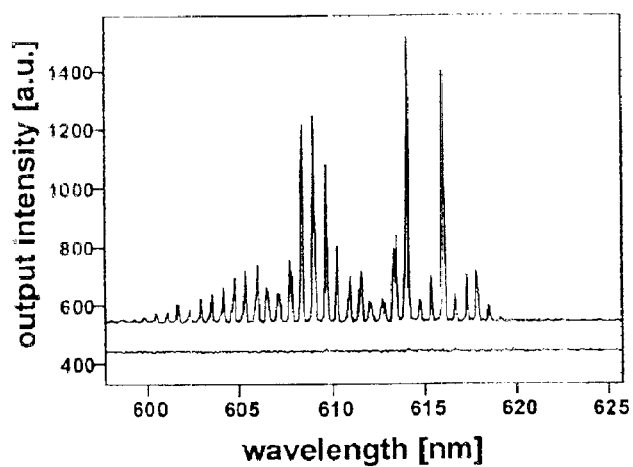

An example is given in FIG. 2, where the optical emission is shown for dense glass fiber coated first with mesoporous silica and subsequently with the dye-containing mesostructured silica/P123 composite. The threshold for lasing in this micro-ring configuration can be as low as 1.5 kW-cm$^{-2}$, which can be adjusted by changing the thicknesses and/or compositions of the glass fiber, mesoporous silica coating, or dye-containing mesostructured silica/P123 composite. In this case, the excitation irradiance was 6 kW-cm$^{-2}$.

Figure 3:
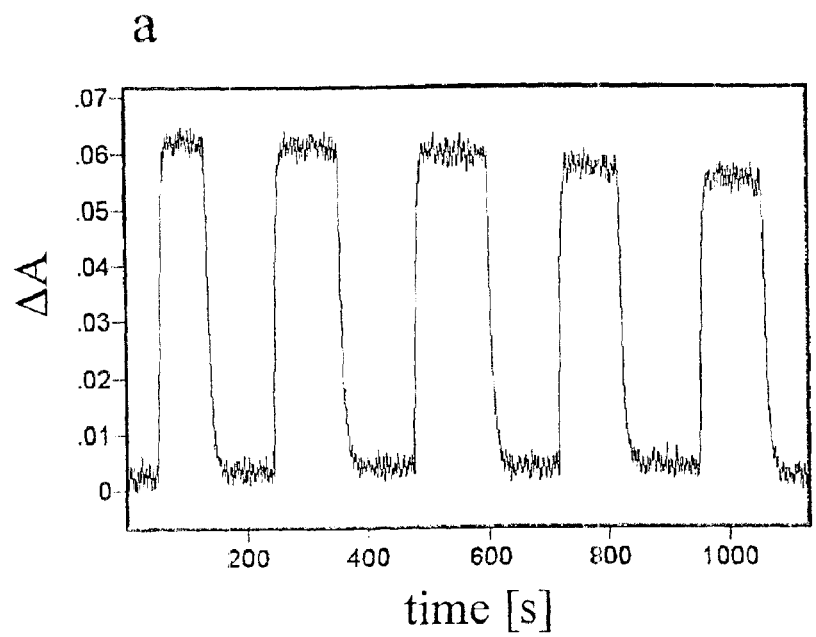
FIG. 3 shows a) photochromic (absorbance) changes initiated by exposure to UV light of a spirooxazine-doped mesostructured silica/P123 block copolymer film, and b) the structure of spirooxazine.
Figure 3:
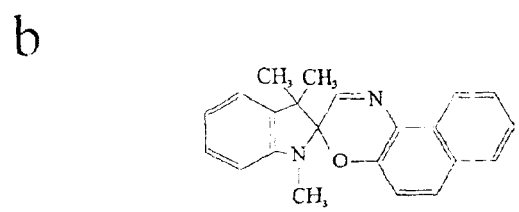

The hybrid nature of the mesostructured inorganic/organic composites provides different local regions into which optically responsive species can be incorporated. For example, photochromic dyes like spirooxazines (the structure of spirooxazine is shown in FIG. 3*a*, used here in the closed form) can be incorporated into the organic regions of the mesostructured inorganic/organic hybrid materials described herein, resulting in high dye dispersions and rapid optical responses. For such photochromic dye-containing mesostructured silica/block copolymer thin films, very fast optical response times are possible (nearly as fast as in solution, i.e., k=0.15 s$^{-1}$ vs k=0.2 s$^{-1}$ in ethanol solution). Such fast response times are attributed to the local environment of the dye species, which is influenced by the block copolymer species, in this case amphiphilic P123, a poly (ethyleneoxide)-poly(propyleneoxide)-poly(ethyleneoxide) triblock copolymer, $(EO_{20}PO_{70}EO_{20})$. FIG. 3 shows typical on/off cycles absorption changes initiated by exposure to UV light from an Ar$^+$ laser and thermal back fading. From the fit of the thermal fading data, a rate constant of k=0.15 s$^{-1}$ was obtained. This very fast response is nearly equal to that of the same dye in ethanol (k=0.2 s$^{-1}$) and also comparable to the fastest response observed for this dye species in solid-state matrices (k=0.2 s$^{-1}$) [Schaudel, B.; Guermeur, C.; Sanchez, C.; Nakatami, K.; Delaire, J. A., *J. Mater. Chem.* 1997, 7, 61]. The hybrid inorganic/organic nature yields a local environment in which the dye can relax nearly as fast as in solution. Note that in conventional sol-gel glasses, not only a much slower response is observed (on the time scale of minutes to hours), but the materials exhibit an undesirable change from direct to reverse photochromism during ageing/drying [Levy, D.; Avnir, D., *J. Phys. Chem.* 1998, 92, 4734].

Other optically responsive species, such as optical limiting dyes for laser safety, also benefit from the hybrid nature of these composites; interactions with the rigid inorganic network (e.g., silica) impart considerably increased damage resistance compared to dye species that are incorporated in polymeric host materials. For example, incorporation of tetraphenylporphyrin dye species in transparent silica/F127 block-copolymer composite monoliths yields materials with attractive optical limiting properties, as shown in FIG. 6. Increasing the concentration of the amphiphilic structure-directing surfactant polymer species from 0 to 60 wt % increases the dispersion of the porphyrin dye in the monoliths, diminishing undesirable aggregation of the dye species into macroscopic domains. As the intensity of incident laser light is increased, the materials with higher dye dispersions yield lower transmissions of the incident light [FIG. 6(*a*)], though are more prone to long-term damage (FIG. 6(*b*)]. An optimum concentration of approximately 50 wt % F127 yields an acceptable combination of optical limiting and damage resistance properties. While partial nanophase-separation of the hydrophilic and hydrophobic regions is necessary for enhancing dye solubility, high degrees of long-range mesoscopic order are not necessarily required and in this application may not be desirable.

Figure 4:
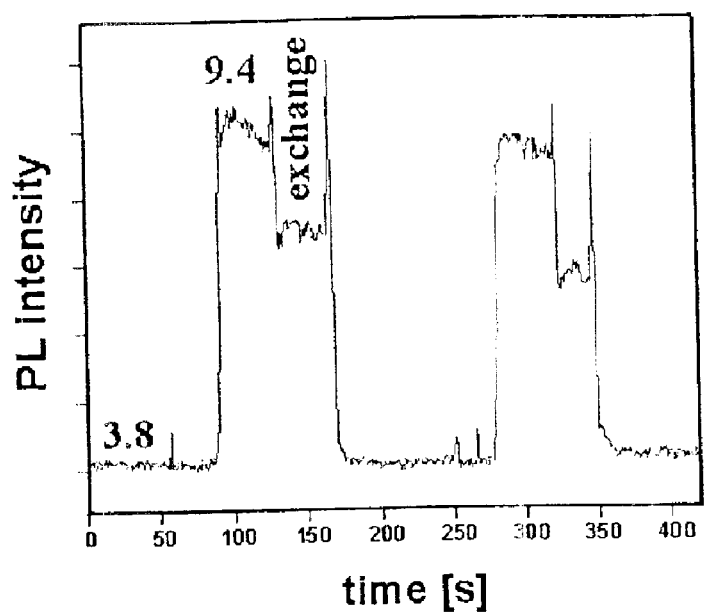
FIG. 4 shows the pH-dependent photoluminescence response of a fluorescein-doped, mesoporous silica thin film in contact with a surrounding solution.

Covalent attachment of dye moieties to the inorganic framework walls after calcination allows removal of the surfactant species to produce mesoporosity without loss of material transparency and thus maintenance of desirable optical properties. Such highly mesoporous materials are ideal candidates for solid-state sensors, where the sensing molecules/complexes/ions can be transported quickly to the active sensing moiety. This can result in sub-second to second response times, an enormous improvement over prior state-of-the-art sol-gel-derived solid-state sensors, for which tens of seconds to minutes response times are typical, because of diffusion limitations through the dense glass. As an example, a fluorescein derivative was incorporated in a silica/block copolymer mesostructured thin film by direct synthesis. After removal of the surfactant, the films showed excellent sensitivity as pH sensors. As shown in FIG. 4, the response time of such a film is on the order of seconds (as measured by the photoluminescence of this film in buffer solutions with different pH.)

Figure 5:
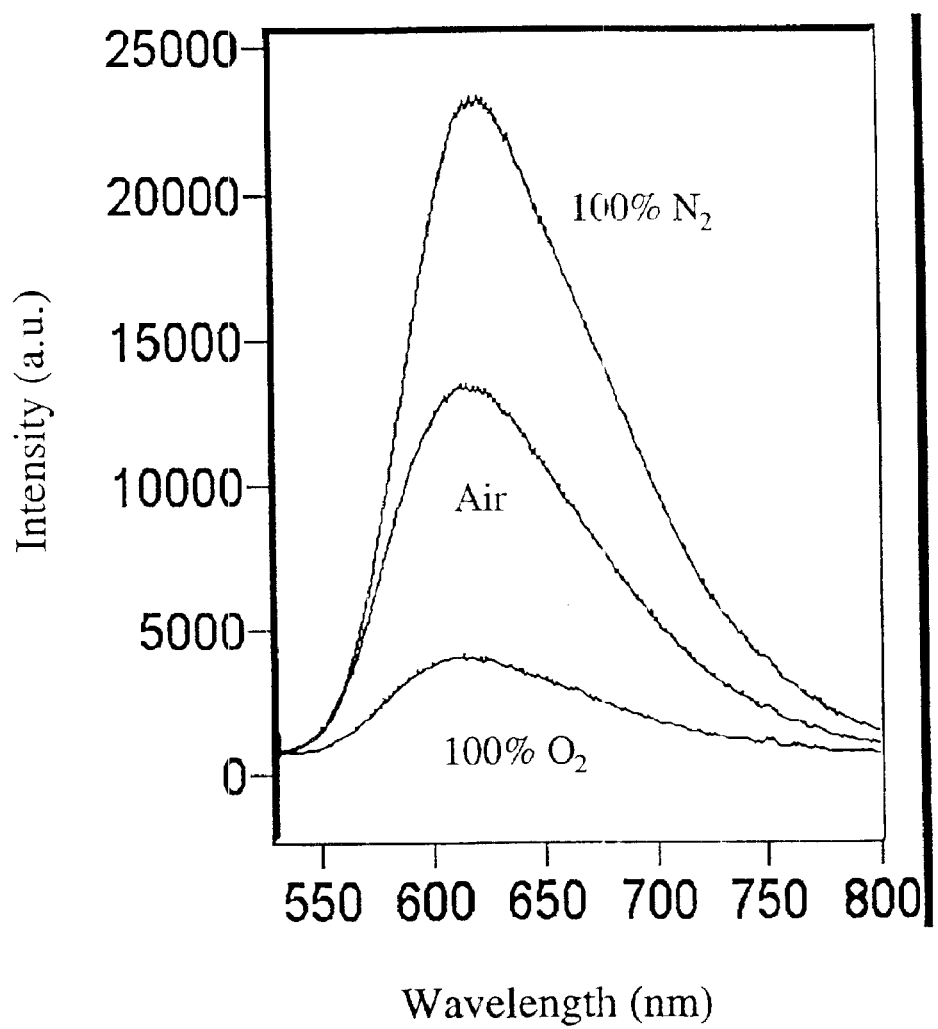
FIG. 5 shows oxygen sensing with a $Ru(bpy)_3^{3+}$-doped mesostructured silica thin film.
Figure 6A:
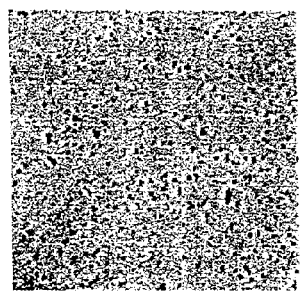
FIG. 6 shows optical images and plots of transmitted light versus (a) incident laser light intensity and (b) number of incident laser pulses for a series of transparent silica/F127 block copolymer monoliths containing the same 2 mM concentration of tetraphenylporphyrin dye species, but with different concentrations of $EO_{106}PO_{70}EO_{106}$ (F127) structure-directing block copolymer species.
Figure 6A:
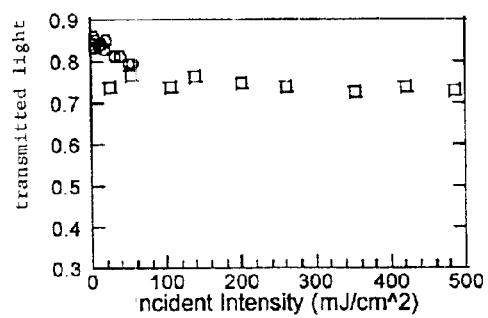
Figure 6A:
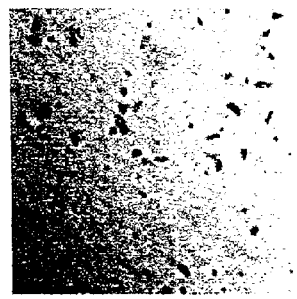
Figure 6A:
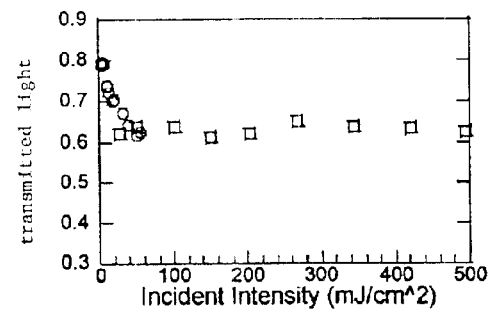
Figure 6A:
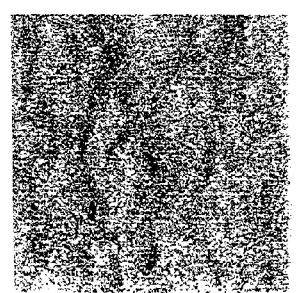
Figure 6A:
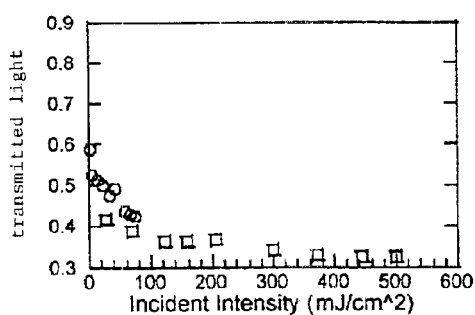
Figure 6B:
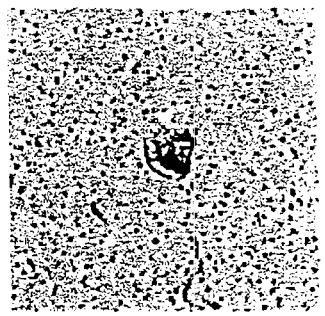
Figure 6B:
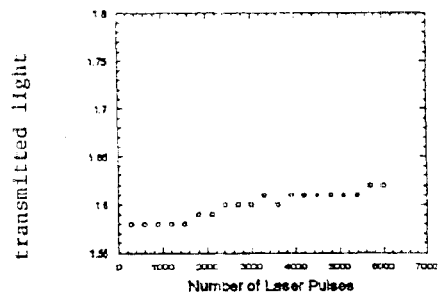
Figure 6B:
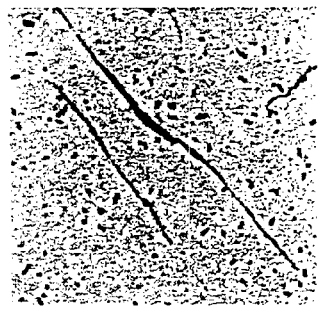
Figure 6B:
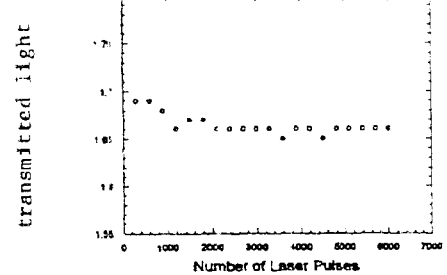
Figure 6B:
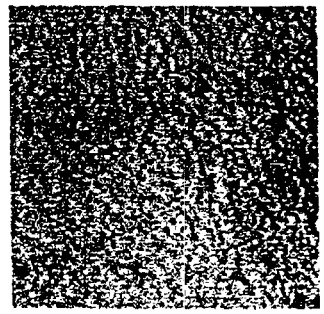
Figure 6B:
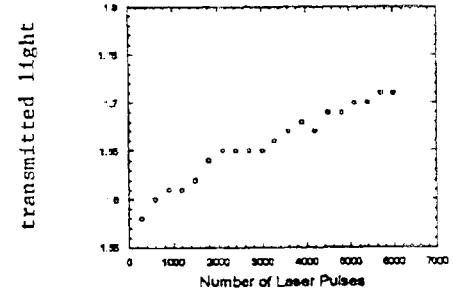

It is also possible to introduce inorganic complexes, organic dyes, or rare-earth species onto the inner walls of high-surface-area mesostructured porous materials. This procedure results in a highly porous matrix with adjustable concentrations of adsorbed molecules that can act, for example, as sensing species. One such example is the post-synthesis deposition of $Ru(bipy)_3^{2+}$, which yields a material that is a very fast (~4 s) oxygen sensor (FIG. 5).

Other applications rely on framework compositions other than silica, e.g., the deposition of sensitizers (energy harvesting and transferring molecules) onto mesoporous $TiO_2$ films. Other types of mesoporous semiconducting oxides, nitrides, or sulfides could be treated in the same way. Applications to pH and oxygen detection have been demonstrated and obvious extensions to other types of optical sensing of adsorbed gases or solution-phase species are apparent.

III. Description of the Best Ways to Practice Invention

Depending on the specific applications above, different preparation strategies for introducing optical functionalities in mesostructured inorganic-organic composite or porous inorganic materials will be preferred, as outlined below.

A. Solubilization of Optically Responsive Species

Optically responsive species can be incorporated into mesostructured inorganic-organic composite or porous inorganic materials by mixing the dye species directly into the synthesis mixture before the mixture is further processed. Typical synthesis mixtures consist of tetraethoxysilane:block-copolymer:ethanol:HCl:H₂O:dye in mole ratios of 1:0.008 ¾ 0.02:20–60:0.01–0.04:5–10:0–0.006. A variety of block-copolymers can be used for these syntheses, including, but are not limited to, amphiphilic Pluronic (P123, F127, etc.) and Tetronic surfactants [Pluronic and Tetronic are registered trademarks of BASF]. Clear solutions are obtained when the above synthesis mixtures are refluxed for one to several hours. The optically responsive species can be incorporated into different regions of the heterogeneous mesostructured products, for example into hydrophilic or hydrophobic regions of the materials, depending on thermodynamic or kinetic factors, such as the species' relative solubilities and diffusion properties.

Afterwards, the synthesis mixture can be processed into different macroscopic shapes. Examples include the drawing of fibers, molding or extrusion of monoliths, and coating of substrates by dip-coating, spin-coating, or patterning, for example by using soft lithography methods. Optical fibers (with diameters in the $\mu$m to mm range) can be coated by using such methods.

The time required for the formation of a mesostructured, dye-doped composite material depends on the processing conditions, and can range from seconds to several hours (3 h for thin films prepared with F127).

Figure 7:
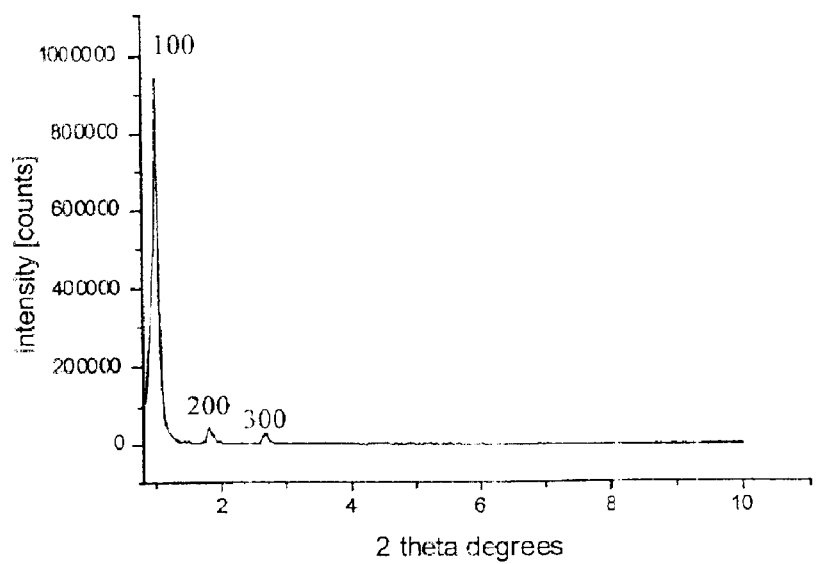
FIG. 7 shows the X-ray diffraction pattern of a mesostructured waveguide array prepared with the amphiphilic triblock copolymer P123 ($EO_{20}PO_{70}EO_{20}$)
Figure 8:
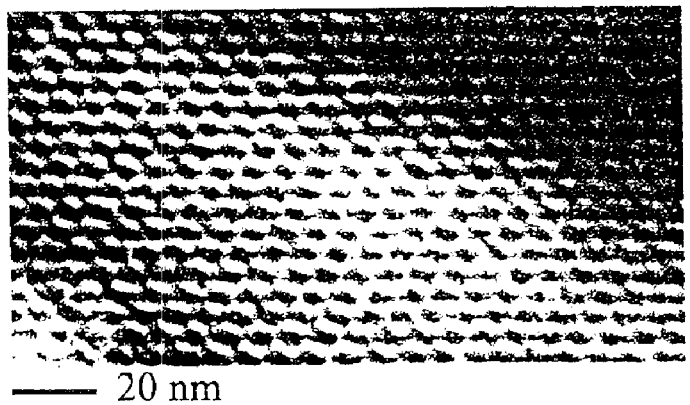
FIG. 8 shows transmission electron micrograph (TEM) images of a hexagonal dye-doped mesostructured silica/P123 waveguide.
Figure 8:
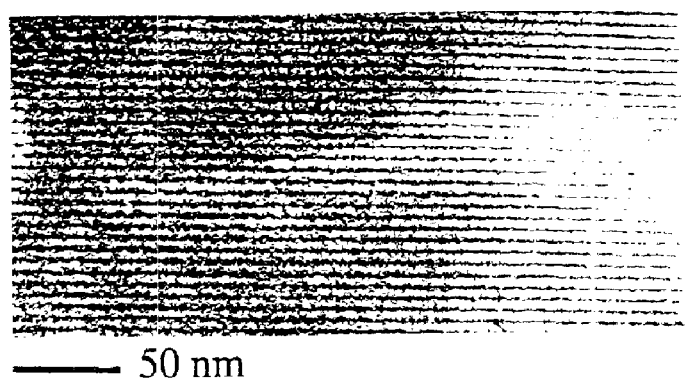
Figure 9:
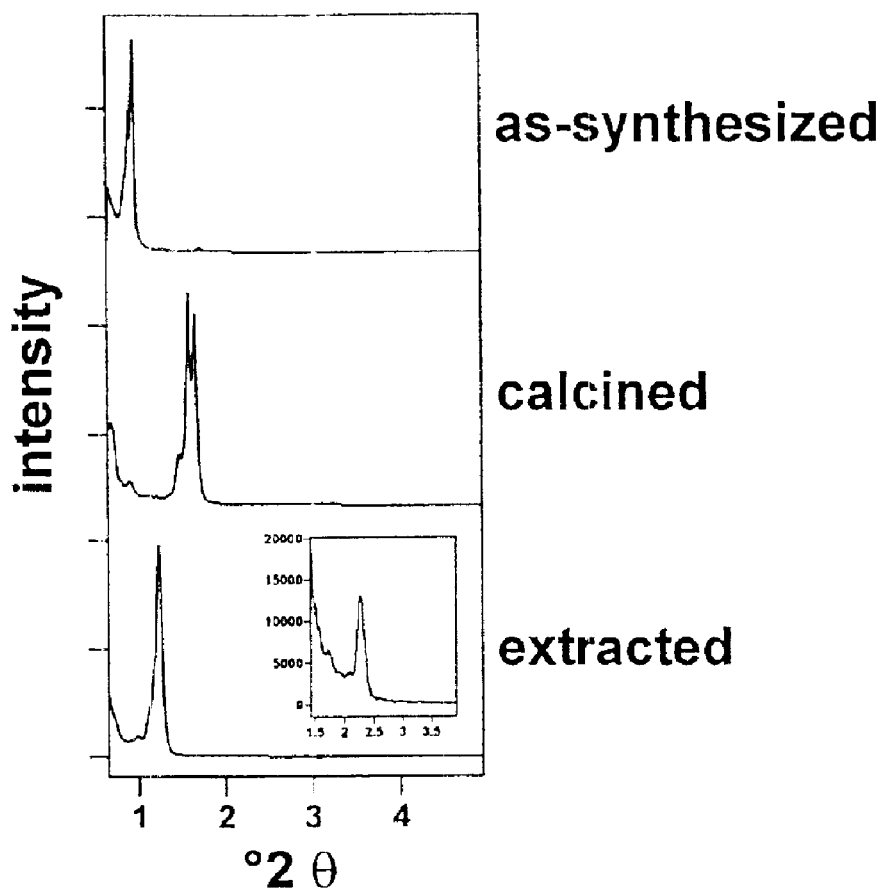
FIG. 9 shows the X-ray diffraction patterns of an as-synthesized mesostructured silica/F127 thin film and the same film after extraction with ethanol or after calcination to remove the block copolymer species.

FIG. 7 shows a typical X-ray diffraction pattern of a mesostructured hexagonal silica/P123 $(EO_{20}PO_{70}EO_{20})$ composite thin film. Several sharp higher order d100 diffraction lines are observed, indicating a high degree of mesostructural order and alignment of the channels parallel to the substrate plane. FIG. 8 shows typical transmission electron microscopy (TEM) images acquired for a similar hexagonal silica/P123 $(EO_{20}PO_{70}EO_{20})$ composite thin film containing up to 1 wt % organic dye species and processed using soft lithography. The TEM images show views along different crystallographic axes. The dye doping does not affect the mesostructural order up to the relatively high dye concentrations examined (ca. 1 wt %). This general procedure was used to prepare the rhodamine-6G- or spirooxazine-included mesostructured silica/block-copolymer composite waveguides, whose optical responses are shown in FIGS. 1b, 2, and 3a.

B. Covalent Attachment of Optically Responsive Species

Optically responsive species can be incorporated into mesostructured inorganic-organic composites or porous inorganic materials by direct covalent attachment of the optically responsive species to one or more of the components within the material. This requires that the optical responsive species be functionalized to form covalent bonds, for example, to the inorganic framework, the block copolymer species or other components in the mesostructured system. Such bonds can be formed the inorganic framework, within different regions of nanophase-separated block copolymer species, or at interfaces between these components.

A typical example is the incorporation of modified fluoresceinisothiocyanate dye species into mesostructured silica/ P123 $(EO_{20}PO_{70}EO_{20})$ composite by covalent attachment of the dye to the silica framework. Fluoresceinisothiocyanate was used as pH-sensitive dye and was derivatized with 3-aminopropyltriethoxysilane to permit covalent bonding with the silica framework. Typically, 7 mg of fluorescein-isothiocyanate were dissolved in 20.4 g of ethanol and allowed to react with 10 mg of 3-aminopropyltriethoxysilane for 3 h. Afterwards, 2.0 g of the block-copolymer F127 [poly(ethylene oxide)-b-poly (propylene oxide)-b-poly(ethylene oxide), $(EO)_{106}(PO)_{70}(EO)_{106}$, BASF], 1.6 g $H_2O$, 0.25 g HCl (2 n) and 8.5 g tetraethoxysilane (TEOS) were added. This solution had a molar composition of $TEOS:F127:H_2O:HCl:FTIC:APTS:EtOH=1:4-10^{-3}:2.76:0.012:4.16-10^{-4}:1.1-10^{-3}:13.1$ and was refluxed for one hour. After the solution cooled to room temperature, thin films were prepared by dip-coating or spin-coating. Dip-coated films were withdrawn from solutions at a rate of 10 cm/min, resulting in 900-nm thick films coated over an area of 2.5×2.5 cm². Spin-coated films (~1500 nm) tended to possess more uniform thicknesses (variations of 5%), compared to dip-coated films, as measured by profilometry. The XRD patterns obtained from the spin-cast materials exhibited several sharp low-angle peaks (up to seven, see FIG. 7), demonstrating that high degrees of mesoscopic ordering are preserved even after removal of the block-copolymer species (by calcination or solvent extraction). The intensities of IR bands in the range of 2700–3000 cm$^{-1}$, corresponding to C–H vibrations, are greatly reduced, confirming that the surfactants were removed essentially completely by this treatment.

Advantage of covalent attachment of the optically responsive species within the mesostructured inorganic-organic composites or porous inorganic materials is that undesirable leaching of the optical species is prevented. Materials in this class, with anchored dyes, highly porous mesostructures and optical transparency, are expected to find use as fast chemical sensors, where the porosity enables rapid diffusion of the molecules/ions to be sensed to the active detection sites. This general procedure was used to prepare the fluorescein-doped mesoporous silica thin film, whose pH-dependent photoluminescence response is shown in FIG. 4.

C. Post-synthesis Incorporation of Optically Responsive Species

Another route to optical solid-state sensors is to synthesize the mesostructured material first (as described above), remove the polymer surfactant species (either by calcination or extraction), and then use the resulting high surface area mesoporous oxide to incorporate molecules by adsorption or ion exchange. This method is similarly useful for the preparation of mesoporous sensing materials containing attached/deposited dye species that optically respond to targeted guest molecules. This general procedure was used to prepare the Ru(bipy)$_3^{3+}$-doped mesostructured silica thin film, whose oxygen-dependent response is shown in FIG. 5.

Optically or redox responsive species can be introduced into a mesoporous inorganic solid (prepared as described above), for example, by ion-exchanging appropriate salts (e.g., halides) for protons associated with framework silanol groups or by chemical adsorption of the responsive species from the gas-phase or from solution.

D. Transparent Pluronic/Silica Composite Monoliths

Materials like those shown in FIG. 6 are prepared by incorporating the desired dye species into the synthesis procedure described in Melosh, N. A., et al, supra. (incorporated herein by reference).

E. Preparation of a Wave Guide

Rhodamine-6G-doped mesostructured silica was prepared from an acidic sol-gel solution using amphiphilic block copolymers, such as $EO_{20}PO_{70}EO_{20}$ (P123) and $EO_{106}PO_{70}EO_{106}$ (F127). Using a low refractive index (n~1.2) mesoporous $SiO_2$ as a substrate, the synthesis was combined with soft lithography to produce high-quality waveguides. This enables efficient waveguiding in the soft-lithographically-patterned rhodamine-6G-doped mesostructured silica/block copolymer composites, which have a higher refractive index than the mesoporous substrate or air. X-ray diffraction patterns and transmission electron microscopy revealed hexagonal mesophases, whose longitudinal cylinder axes were aligned predominantly parallel to the substrate plane. For samples made by micromolding-in-capillaries (MIMIC), the longitudinal axes were also aligned along the longitudinal waveguide axes. Samples made by micromolding (MIM) also possess a high mesostructural order, though in the absence of an aligning flow field, their long range ordering (ca. several hundred nanometers) is lower than for samples processed using the MIMIC technique.

When optically pumped, the rhodamine-6G-doped waveguides exhibited amplified spontaneous emission with thresholds as low as 5 kW-cm$^{-2}$, substantially lower than rhodamine-6G-doped sol-gel glasses and ORMOSILS. This is attributed to the ability of the polymeric surfactant to co-assemble with the dye molecules, thereby leading to high dye dispersions and reduced dye dimerization. Additionally, rhodamine 6G showed good photostablility in the mesostructured waveguides, similar to that of rhodamine 6G in non-mesostructured organically modified silicates.

1. Sample Preparation:

Patterned mesostructured silica/PEO-PPO-PEO waveguides containing optically responsive species were prepared on mesoporous silica thin film substrates cast on a silicon surface, as follows. Solutions of the same composition previously used for mesostructured (including mesoporous) film preparation by dip-coating [Aksay, I. A., et al, supra] were spin-coated on silicon wafers (2000 rpm) to produce films with thicknesses of about 1 μm. These films were calcined by heating them to 673 K within 4 h and holding them at this temperature for 4 h.

After cooling, waveguide structures were patterned on top of these mesoporous silica films by soft lithographic methods using polydimethoxysilane (PDMS) stamps to organize macroscopically a polymerizing silica sol-gel mixture in the presence of mesostructure-directing P123 triblock copolymer species. For the patterning of dye-doped waveguide arrays, the block copolymer-silica mesophases had the following compositions: $EO_{20}PO_{70}EO_{20}$ (P123) :tetraethoxysilane (TEOS):EtOH:$H_2O$ HCl:R6G= 0.0172:1.00:22.15:5.00:0.02:0.001–0.006 (in molar ratios). Solutions were prepared by combining P123, EtOH, $H_2O$, HCl, and TEOS and refluxing the resulting clear solution for 1 h. After the solution was cooled, R6G was added and the solution was stirred for an additional hour. For the waveguides prepared with $EO_{106}PO_{70}EO_{106}$ (F127), the same mass of surfactant was used as in the P123 preparations. For materials synthesized using either P123 or F127, the concentration of the R6G dye species was varied, ranging from about 0.25 wt % to 1.75 wt % in the final solid. The final R6G concentrations in the solids are reported with respect to the amount of P123 and $SiO_2$ (assuming that TEOS fully hydrolyzed and condensed into $SiO_2$).

Patterning was performed by using either micromolding (MIM) or micromolding-incapillaries (MIMIC) techniques to produce surface replicas of the relief patterns of the PDMS stamp. [Wu, J., et al, supra; Dag, O., et al, supra; and Yang, P.; Wirnsberger, G., et al, supra.] For MIM, a drop of the solution described above was placed on the mesoporous silica film support, covered by a stripe-patterned PDMS stamp, and a slight pressure applied to dewet the surfaces between the individual stripes. In the case of MIMIC, the PDMS stamp was first placed on the mesoporous silica film support, a drop of solution was placed at both ends of the stamp, and the line arrays were allowed to fill by capillary flow. [Wu, J., et al, supra] No cleanroom facilities were used during the waveguide preparations.

2. Characterization Measurements

Prior to characterization, the waveguide patterns were cleaved to remove thick corrugated regions that formed near the edges of the PDMS patterns. X-ray diffraction (XRD) patterns were obtained on a Scintag diffractometer. Scanning electron micrographs (SEM) were recorded on a JEOL 6300-F after sputtering the samples with gold. Film thicknesses where measured with a DEKTAK profiler. Photo luminescence spectra were recorded in a 90° setup (see below). Optical measurements were performed using light from the second harmonic of a Nd:YAG laser (532 nm, about 10 ns pulse width, 10 Hz repetition rate), which was passed through calibrated neutral density filters and an adjustable slit and focused by a cylindrical lens onto the sample (typically to an area of 2 mm×0.5 min). Light emerging from the end of the waveguides was collected by a cylindrical lens and focused on the entrance slit of a 0.25 in monochromator (150 grooves/mm). For signal detection, a liquid-nitrogen-cooled CCD detector was used. As a rule, the waveguide patterns were used for measurements between hours and three days after their preparation.

3. Mesostructural Ordering and Alignment

Figure 10:
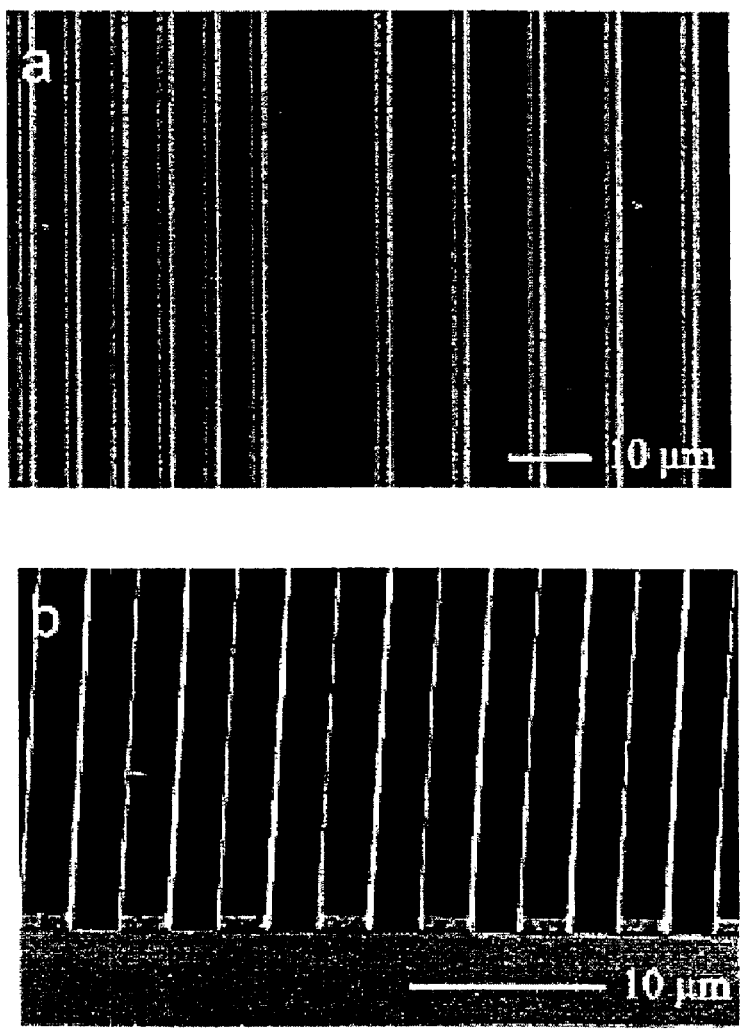
FIG. 10 is a scanning electron micrograph (SEM) image showing a) mesostructured waveguide patterns having different spacings, and b) the waveguide ends after cleaving the substrate. Note the relative smoothness of the cleaved edges.

Mesostructured inorganic/organic composites can be processed using soft lithography techniques, for example, MIM and MIMIC methods, to produce patterned mesostructured waveguides. Such approaches have been used to produce arrays of several-millimeter-long stripe features with smooth surfaces and few macroscopic defects, as shown in the SEM images of FIG. 10. By using poly(dimethylsiloxane) (PDMS) stamp molds with different line spacings, the distances between the individual waveguides were adjusted (FIG. 10a). Furthermore, it is also feasible to produce waveguides with different cross sections (for example, rectangular or trapezoidal shapes). The high surface qualities of the line patterns demonstrated in FIG. 10b are essential for achieving low-loss waveguiding. Cleavage of the waveguides perpendicular to the long axes of the waveguides after synthesis generally results in relatively well-defined front faces (FIG. 10b).

Figure 11:
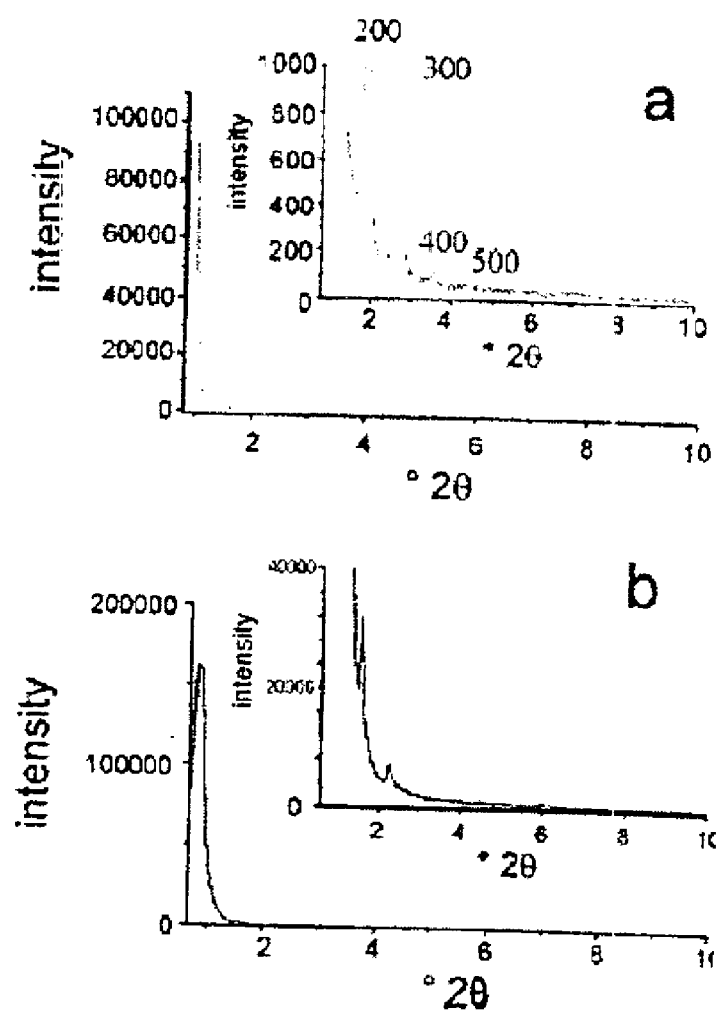
FIG. 11 shows XRD patterns of waveguide arrays synthesized with a) P123 and b) F127 block copolymer surfactant species.
Figure 12:
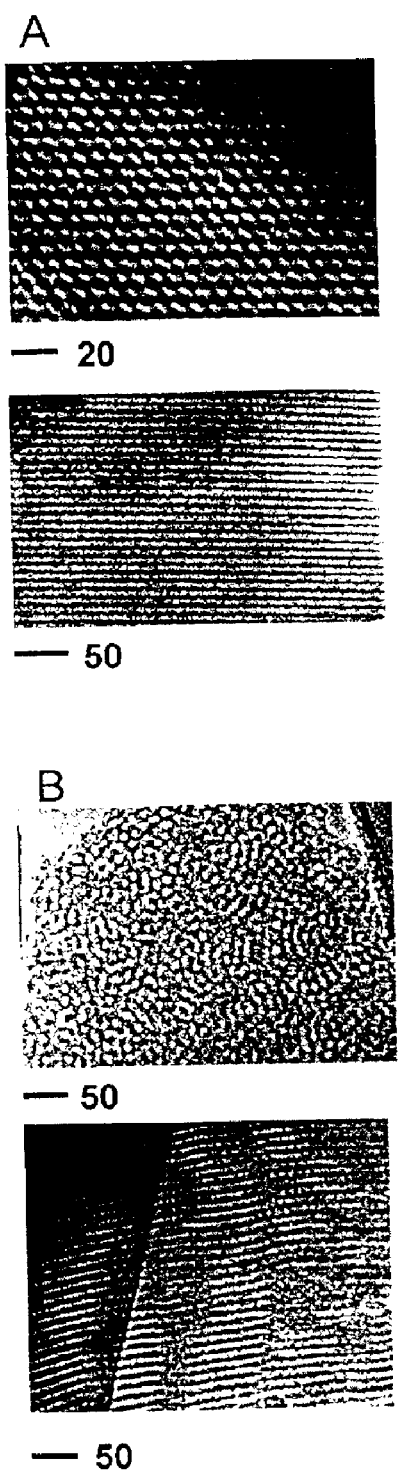
FIG. 12 shows TEM images of calcined transparent mesostructured silica waveguides prepared with a) P123 and b) F127 triblock-copolymer species using soft lithographic patterning.

Using P123 as the structure-directing surfactant species and MIMIC to form the line patterns, highly ordered hexagonal mesostructured waveguides are produced. As shown in FIG. 11a, the corresponding XRD patterns exhibit as many as five 100 reflections. This XRD pattern is similar to that observed for SBA-15 films [Zhao, D.; Yang, P., et al, supra] and is due to a high degree of ordering and strong preferred orientation of the channels parallel to the substrate plane. Under the conditions used here, hexagonal (p6 mm symmetry) silica/P123 mesophases are favored, while silica/F127 mesophases can lead to cubic or hexagonal mesostructures [Zhao, D.; Yang, P., et al, supra; and Melosh, N. A.]. As shown in FIG. 11b, XRD patterns for the waveguides made with F127 show one strong $d_{100}$ reflection and a weaker $d_{200}$ reflection. TEM images in FIG. 12a (top) and 12b show regions that confirm hexagonal (p6 mm) mesostructural ordering in these waveguide materials.

For samples produced using the MIMIC method, TEM (FIG. 12a, bottom) also shows extended arrays of well-ordered regions of parallel channels that are much longer than the cross section of the waveguides. The uniaxial capillary flow of the sol-gel/block copolymer synthesis mixture into the MIMIC mold yields orientationally ordered mesophases. For hexagonal mesostructures, the channels align parallel to surface plances and also parallel to the long axes of the waveguides. This finding is in agreement with previous studies of the orientational ordering of aggregates in line patterns during the synthesis of SBA-3 prepared with low-molecular-weight amphiphilic surfactants (e.g., cetyltrimethylammoniumbromide) and MIMIC in electric fields [Trau, M., et al, supra] and with calculations that indicate the disfavored formation of end caps in cylindrical micelles. [Keller, S. L.; Boltenhagen, P.; Pine, D. J.; Zasadzinski, J. A. Phys. Rev. Lett. 1998, 80.] Similar XRD patterns were observed when MIM and P123 were used for the preparation of the waveguides. However, TEM inspection shows that these samples are not as well ordered (on a length scale of several hundred nm) as samples synthesized using MIMIC.

Similar to the mesostructured silica/block copolymer waveguides prepared using P123, MIMIC processing of F127/silica mixtures yield waveguides that have excellent long range order, again with channel alignment parallel to the waveguide axes. However, longer length-scale ordering (ca. several hundred nanometers) appears to be somewhat less than when MIM is used. Under capillary flow conditions, the cylindrical aggregates of the hexagonal mesostructure orient along the flow direction, as similarly found for dip-coated films. [Zhao, D.; Yang, P., et al, supra.] This is not the case when samples are prepared by the MIM technique, where the cylindrical aggregates align mainly parallel to the substrate plane, but are less well orientationally ordered in the absence of the additional capillary shear flow field.

4. Amplified Spontaneous Emission

Figure 13:
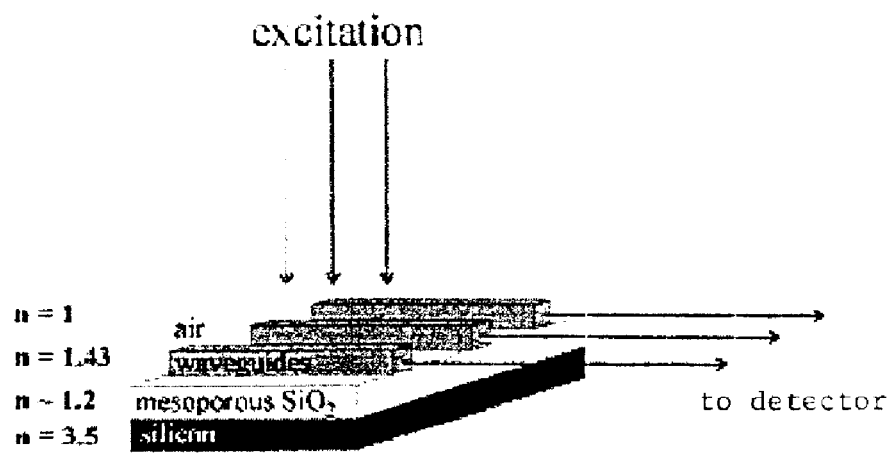
FIG. 13 shows a schematic representation of the mesostructured waveguide device architecture and measurement configuration.
Figure 13:
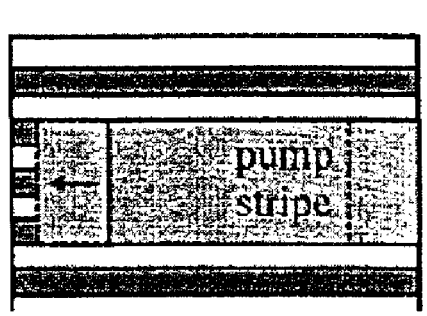

Due to the low refractive index of the mesostructured block-copolymer-silica waveguides (n~1.43), waveguiding cannot be achieved on supports with higher indices of refraction, such as commonly used silicon (n=3.5) or silica glass (n=1.51). However, low-refractive-index mesoporous silica films can be used as support substrates. Such films are conveniently prepared from mesostructured block-copolymer-$SiO_2$ thin films (via dip- or spin-coating) to produce mesostructured porous silica films with thicknesses of about 0.5 μm after calcination. XRD patterns of an example of an as-synthesized film show several $d_{100}$ peaks indicative of a preferred alignment of the hexagonal structure in the film plane, [Zhao, D.; Yang, P., et al, supra], which is preserved following calcination, though ordering is diminished. The thin supporting films are mesoporous and possess low refractive indices n=1.15 to 1.3, depending on the porosity. Waveguiding results within the composite line patterns from internal reflection of light at the lower refractive index mesoporous $SiO_2$ and the air interfaces. Waveguide modeling shows that around 20 modes are supported in this step-index waveguide structure. FIG. 13 depicts this multilayer structure schematically, together with the measurement configuration.

Figure 14:
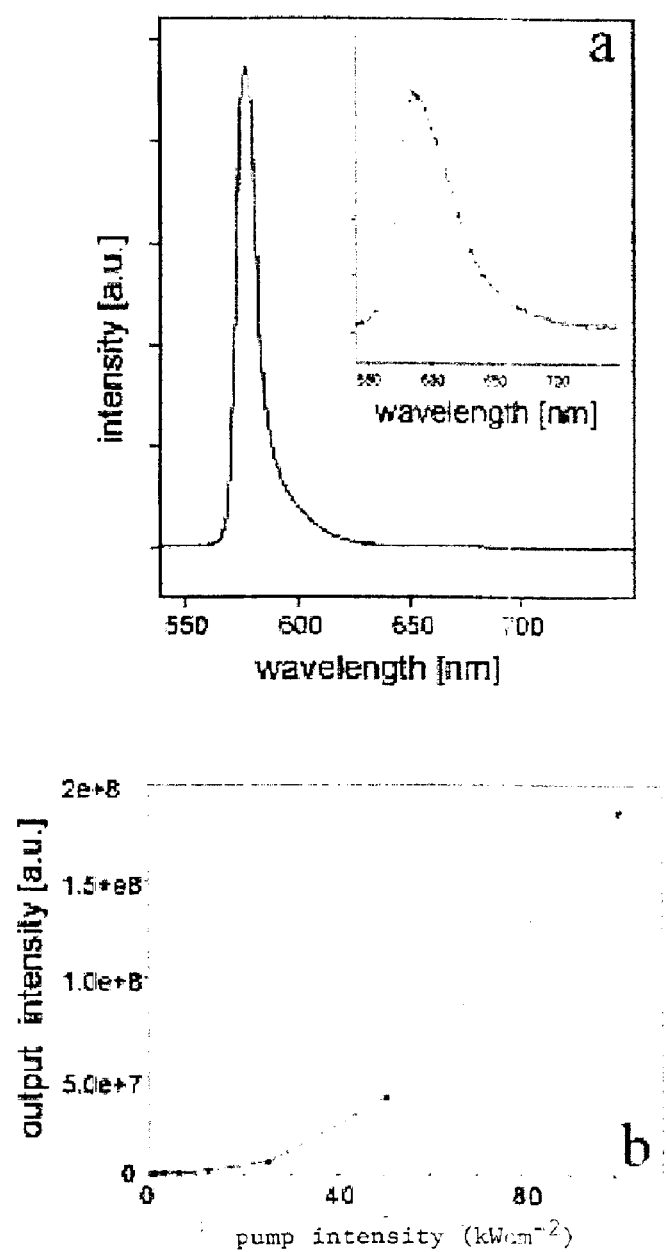
FIG. 14 shows a) optical emission spectra and b) output vs. excitation irradiance of 0.58 wt % R6G-doped mesostructured silica/P123 waveguides below (inset) and above the threshold.

When the R6G-doped waveguides are exposed to the second harmonic light of a Nd:YAG laser (532 nm) in a 90° geometry (FIG. 13), at low light intensities (~0.8 kW-cm$^{-2}$) a broad photoluminescence spectrum is observed with a full-width-at-half-maximum (FWHM) of around 50 nm. As the excitation irradiance increases, however, the spectrum begins to narrow and finally a gain-narrowed band with a FWHM of 7–8 nm is obtained (FIG. 14a). A typical dependence of the output light intensity on laser power is depicted in FIG. 14b for a hexagonally ordered silica/P123 mesostructured waveguide containing 0.58 wt % R6G. From these data, a low threshold of about 25 kW-cm$^{-2}$ is deduced. (The threshold is taken to be the value where the linewidth of the spectrum has decreased to decreased to half the FWHM value observed at low pumping energies.) As no cavity is present, the observed effects are indicative of amplified spontaneous emission (ASE), an effect in which spontaneously emitted light is amplified as it propagates along the waveguide. [Siegman, A. E. Lasers, University Science Books, Mill Valley 1986; and Silfvast, W. T. Laser Fundamentals, Cambridge University Press, Cambridge 1996.]

Figure 15:
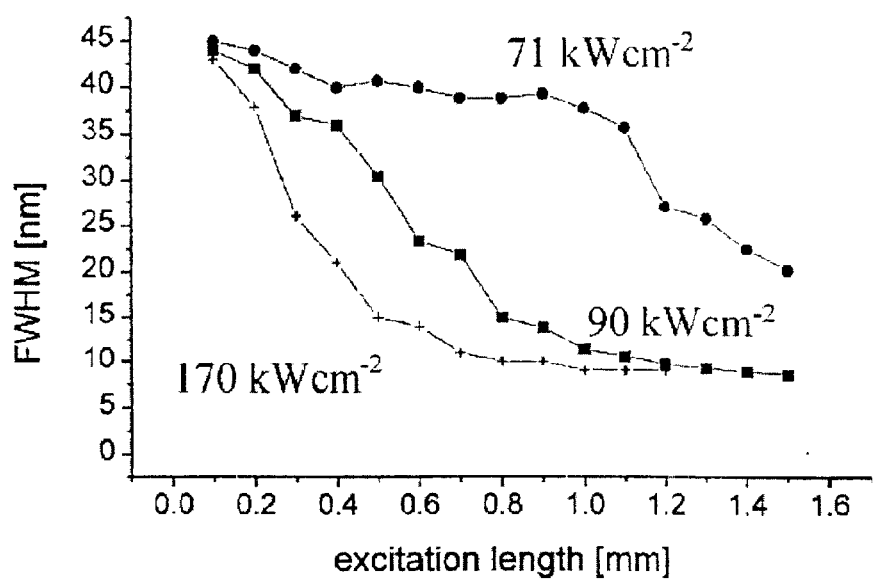
FIG. 15 shows the full-width-at-half-maximum of the device's optical emission manifold (from the same waveguide system as in FIG. 14), as a function of the excitation strip length and excitation irradiance.

To establish unambiguously that the observed gain-narrowing behavior is due to ASE, a type of mirrorless lasing, we performed a variable stripe experiment, in which the length of the excitation stripes (i.e., the waveguide lengths) were varied. [Vlasov, Yu. A.; Luterova, K.; Pelant, I.; Hdnerlage, B.; Astratov, V. N.; Appl. Phys. Lett; 1997, 71, 1616; and McGehee, M. D.; Gupta, R.; Veenstra, S.; Miller, K. E.; Diaz-Garcia, M. A.; Heeger, A J, J. Phys. Rev. B, 1998, 58, 7035] The results in FIG. 15 clearly show that the gain-narrowing is dependent on the waveguide/excitation stripe length and confirm its origin as resulting from ASE.

For a certain energy, e.g., 90 kW-cm$^{-2}$, the spectra narrow with increasing power until no further gain-narrowing occurs, and the FWHM remains constant in spite of further increase in the waveguide/excitation stripe length. As several low order modes are supported, the ASE light does not show a large polarization dependence; the ratio of the light propagating parallel versus that propagating normal to the substrate plane is approximately 6.

The loss in the R6G-doped mesostructured silica waveguides at the ASE wavelength was determined by varying the waveguide/excitation stripe length and monitoring the output emerging from the end. [McGehee, M. D., et al, supra.] In these experiments, the excitation irradiance was well above the threshold. The intensity, I, of the light emerging from the end of the waveguides when the waveguide/excitation stripe is moved a distance, x, from the end (see FIG. 13) is given by $I = I_o e^{-\Delta x}$ where $I_o$ is the output intensity, when the waveguide/excitation stripe is focused just on the end and $-\Delta x$ is the loss in cm$^{-1}$. Loss measurements were performed on 10 different waveguide patterns, which consistently yielded loss values between 16 cm$^{-1}$ and 25 cm$^{-1}$ from the fits. These values, at the ASE wavelength, are smaller than values reported for pure semiconducting polymers (20 cm$^{-1}$, 44 cm$^{-1}$, and 90 cm$^{-1}$) [McGehee, M. D., et al, supra; and Gupta, R.; Stevenson, M.; Dogariu, A.; McGehee, M. D.; Park, J. Y.; Srdanov, V.; Heeger, A. J.; Wang, H. *Appl. Phys. Lett.* 1998, 73, 3492], but higher than those for polymer blends, where energy transfer occurs (values between 1 cm$^{-1}$ and 7 cm$^{-1}$). [Gupta, R., et al, supra; and Berggren, A.; Dodabalapur, A.; Slusher, R. E.; *Appl. Phys. Lett.* 1997, 71, 2230.] The losses in the silica/block-copolymer waveguides are attributed to several factors. First, at the ASE wavelength, R6G molecules still absorb energy (self-absorption), albeit with a low absorption cross-section. Secondly, the supporting thin films sometimes exhibit bubble-like defects (in the nm to $\mu$m size range), which can act as scattering centers in the waveguides. Whereas the presence of defects can be reduced by improved processing, self-absorption is an intrinsic challenge that is expected to be important from an application point of view.

5. Photostability

The photostability and material lifetime of optical materials are important performance properties, particularly in laser systems. For comparison, the photostabilities of R6G incorporated in mesostructured silica/PEO-PPO-PEO composites was compared to the photostability of R6G incorporated into inorganic or organic host matrices, including sol-gel-derived silica glass and polymers. Whereas the photostability of R6G was reported to be very low under laser action in doped inorganic salts, such as potassium sulfate ($K_2SO_4$), it is higher in polymeric hosts [such as poly (methylmethacrylate)] and significantly higher in sol-gel-derived oxide materials. An exact comparison is difficult, because different measurement configurations (e.g., laser action by ASE or realization of a laser cavity) or macroscopic shapes of the samples (e.g., monoliths or thin films) have been used. However, the literature data generally reveal that the photostability of R6G is substantially better in sol-gel-derived $Al_2O_3$ and silica than in organic polymers. [Zink, J. I., et al, supra; Knobbe, E. T., et al, supra; and Dunn, B.; Zink, J. I.; *J. Mater. Chem.* 1991, 1, 903.] This was also evidenced in the only study of which we are aware that focused on the stability of four dyes in different host materials under nearly identical conditions. [Rahn, M. D.; King, T. A.; *Appl. Opt.* 1995, 34, 8260.]

Figure 16:
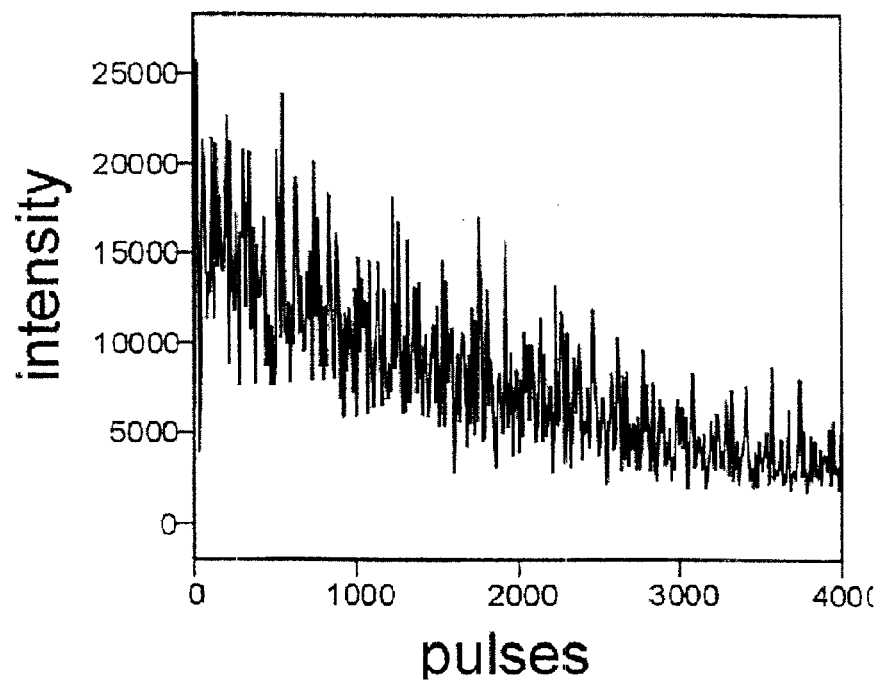
FIG. 16 shows emitted light intensity vs. number of pulses for pump intensities well above the threshold at excitation of 1.7 $MWcm^{-2}$ and a pulse repetition rate of 2 Hz for a representative R6G-doped mesostructured silica/P123 waveguide.

Extensive work during the last decade to improve photostability led to the development of ORMOSILs as laser-dye host materials. [Zink, J. I., et al, supra; and Knobbe, E. T., et al, supra.] Compared to these materials, dye-doped mesostructured silica/block-copolymer waveguides possess similar photostabilities, leading to similar lifetimes. FIG. 16 shows a plot of output light intensity measured as a function of exposure time to a series of laser pulses incident at different excitation intensities and with different pumping rates. Over a period of several thousand pulses, the photostability depends on both excitation intensity and pumping frequency. For a given pumping frequency, a lower excitation intensity results in enhanced material lifetime. When the pumping frequency is reduced, higher pump intensities can be maintained for a relatively long time: a reduction to half of the original intensity output is observed after ~2500 pulses, even when the excitation intensity is far above the energy required for fully gain-narrowed spectra (see FIG. 16).

6. Effect of Dye Concentration and Surfactant

Besides improved photostability and material robustness compared to organic hosts, a further advantage of mesostructured inorganic-block copolymer composites is their superior performance with regard to the ASE threshold, compared to sol-gel-derived glasses. Under otherwise identical conditions (processing conditions, dye and silica compositions), R6G-doped amorphous silica waveguides (without copolymer species) have thresholds (~200 kW-cm$^-$2) that are more than an order of magnitude higher than those measured for the mesostructured R6G-doped silica/PEO-PPO-PEO block copolymer composites reported in this study. The thresholds of the copolymer-free amorphous silica host materials are significantly higher than for the mesostructured silica/PEO-PPO-PEO hosts and for cetyltrimethylammonium-derived mesostructured fibers. In agreement with these results, previous investigations on dense silica systems [Rahn, M. D., et al, supra] or silica/titania thin films [Yanagi, H., et al, supra] report much higher thresholds.

The low thresholds in the mesostructured silica/PEO-PPO-PEO systems are attributed to the capability of the block copolymer surfactant species to promote a high dye-dispersion and isolation, which reduces undesirable dimerization and resultant self-quenching. This is supported by UV/vis spectra on thin films, which show much lower dimer absorption, in comparison with R6G-doped $SiO_2$ thin films. In addition, the ASE thresholds measured in the mesostructured silica/PEO-PPO-PEO composites depend on the architecture of the block copolymer species. For example, ASE thresholds of ~25 kW-cm$^{-2}$ are reproducibly measured for mesostructured silica/P123 composites containing 0.58 wt % R6G, compared to ~35 kW-cm$^{-2}$ for mesostructured silica/F127 composites. The P123 block copolymers, $(EO)_{20}(PO)_{70}(EO)_{20}$, have shorter hydrophilic poly (ethyleneoxide) segments that appear to contribute to enhanced dispersion of the dye species in the mesostructured composites, compared to F127, $(EO)_{106}(PO)_{70}(EO)_{106}$. Very recently, a high dye-dispersion has been proposed for phthalocyanin-doped small-pore mesostructured materials, as well. [Zhou, H. S.; Honma, I., et al, supra; Zhou, H. S.; Sasabe, H.; Honma, I.; *J. Mater. Chem.* 1998, 8, 515; and Ganschow, M.; Wöhrle, D.; Schulz-Ekloff, G. *J. Porphyrins Phthalocyanins* 1999, 3, 299.] Preliminary experimental results indicate that the block copolymer species appear to interact with the dye molecules, playing an important and beneficial role in preventing aggregation. In a similar context, surfactants have long been used in solution to suppress dye dimerization. [Schofer, F. P. (Ed.), *Topics in Applied Physics, Dye Lasers*, Vol. 1, Springer-Verlag,]

Figure 17:
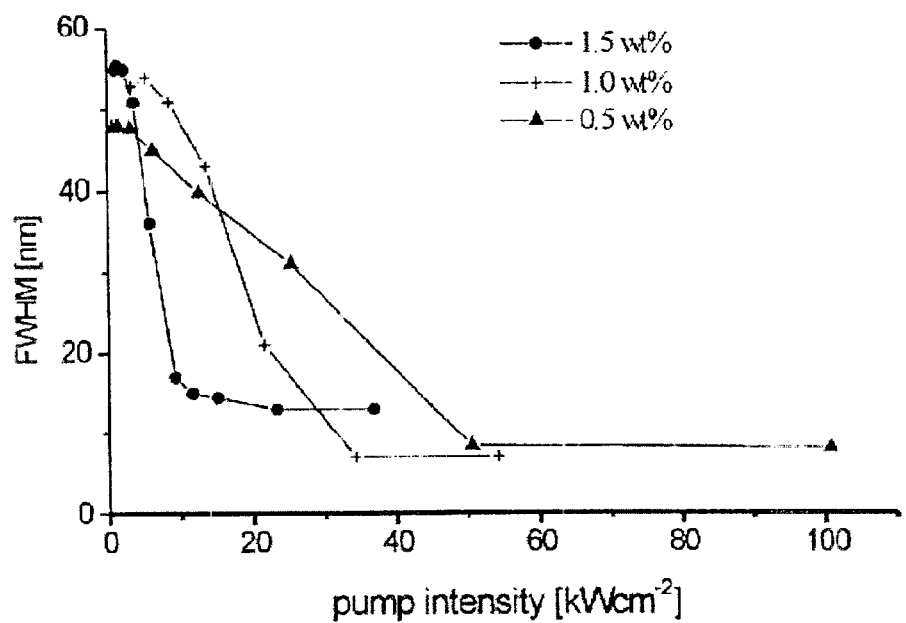
FIG. 17 shows the dependence of the full-width-at-half-maximum (FWHM) of the device's optical emission manifold on the excitation irradiance for the indicated loadings of R6G dye in mesostructured silica/P123 waveguides.

The improved dispersion of R6G molecules in the transparent mesostructured silica/block-copolymer composites allows substantially higher R6G concentrations to be incorporated in the composites without undesirable aggregation or macroscopic phase separation (which leads to opacity.) Dye concentrations up to 1.75 wt % were incorporated, leading to significantly lower ASE thresholds to ~5 kW-cm$^{-2}$ (FIG. 17). The threshold values compare well, even with the best polymers known to date: about 0.1–0.5 kW-cm$^{-2}$ [e.g. Gupta, R. et al., *Appl. Phys. Lett.*, 1998, 73, 3492; Berggren, A.; et al., *Appl. Phys. Lett.*, 1997, 71, 2230; Rahn, M. D.; King, T. A.; *Appl. Opt.*, 1995, 34, 8260]. Such low thresholds observed for the mesostructured silica/block-copolymer composites indicate the favorable effect that the PEO-PPO-PEO species have on promoting high dye solubility, suppressing undesirable dye dimerization, and leading to isolated R6G molecules and improved optical performance.

F. Conclusions

High quality mesostructured inorganic/block-copolymer waveguides can be prepared rapidly by combining soft lithographic methods with acidic sol-gel chemistry in the presence of structure-directing amphiphilic triblock copolymers. Waveguiding in these structures is enabled by the use of low-refractive index mesoporous $SiO_2$ supports, which were spin-cast and calcined on a silicon substrate. [We also patterned mesostructured waveguides directly on silicon. The threshold increased to 100 kW-cm$^{-2}$ (dye concentration of 0.5 wt %)] Due to the convenient preparation procedure, high stability, and good adhesive properties for other materials, we expect that this type of support could find wide application where high-quality low refractive index materials are needed.

Control of the optically responsive species' local environments by may be rationally designed into the composite by exploiting selective partitioning of the optical species among different nanophase-separated components. Laser dyes can be incorporated in a simple one-step synthesis. The surfactants that are present in the mesostructures in high concentrations (about 50% of the total weight) promote desirable dispersion of the rhodamine 6G dye species, thus reducing unwanted dye aggregation. This, in turn, results in the high quantum yields and low thresholds observed in these systems. The fact that non-ionic surfactants with different compositions lead to materials with different optical properties, suggests that the dye molecules are co-assembled with the surfactant and that they are not occluded—at least not exclusively—within the inorganic part.

Dye-doped block-copolymer/silica mesostructured composites are a promising class of compounds for optical applications. Their mesoscopically ordered structures, together with the inorganic/organic hybrid compositions, allows the local environment of included laser dye species to be controlled. Although this is one of the first reports on laser-like emission in mesostructured hosts, the relatively low thresholds observed are promising for the future. The optimization of these materials, such as through reduced dye self-absorption, the use of specifically designed surfactants, selection of different inorganic framework compositions and/or development of low-defect waveguide surfaces, can be anticipated to lead to dye/host systems with improved optical properties and performance.

IV. Possible Modifications and Variations

It is likely that optimization of the composition, structure, and processing conditions of mesostructured inorganic/block-copolymer composites and porous inorganic systems will lead to further improvements in their optical properties and performances. In addition to the methods and applications outlined above, we propose the following modifications and extensions to the preparation and use of novel inorganic/organic mesostructured/mesoporous materials technology for optical and sensing applications. The following will be obvious to those skilled in the art based on the discoveries cited herein and include:

i) Tunable optical properties can be expected through adjustments in the inorganic/block-copolymer/dye compositions, mesostructural organization, and orientational ordering.

ii) Adjustment of the composition or functionalization of the inorganic framework to modify the local electronic environments sensed by the optical responsive species can strongly influence the photophysical properties of the system.

iii) Photostability will be improved by using optically responsive species that may be stabilized by interactions with the inorganic framework or the block copolymer surfactant species.

iv) The tuning of the inorganic wall composition from insulating frameworks to semiconductors or conductors. This is expected to enable the development of electroluminiscent mesostructures. Extensions to other inorganic framework compositions, such as metal oxynitrides, metal oxychalcogenides, metal nitrides, and metal chalcogenides, are obvious in the context of this invention.

v) Lower ASE thresholds are anticipated for laser dye species with reduced tendencies for self-absorption.

vi) Incorporation of multiple optical responsive species may be used to impart synergistic optical effects, such as energy-transfer between different lumophores incorporated into the inorganic/block copolymer composites or mesoporous inorganic solids.

vii) Processing said inorganic-organic mesostructured composites or mesoporous solids by spraying coating, ink-jet printing, or other processes utilizing shear or extensional flow.

viii) Film, fiber, or monolith processing of transparent inorganic-organic mesostructured composites or mesoporous solids containing species with variable optical response (e.g., pH, oxygen, adsorbed molecules from solution, etc.), ultrasensitive optical sensors may be possible. These may be based, for example, on the use of micro-ring-type lasers discussed herein using dye-included mesostructured composite coatings of optical fibers.

ix) Extensions (i–viii) will also function with transparent inorganic/block-copolymer composites and mesoporous solids exhibiting nanophase separation even in the absence of longer-range mesostructural order.

x) The use of transparent orientationally ordered mesostructured inorganic-organic composite or mesoporous films, fibers, or monoliths for alignment of optically responsive species. This leads directly to polarization-dependent optical properties, including selective absorption and/or emission of polarized light, efficient absorption of excitation light for reduced thresholds. The capability to control optical polarization will enable new applications in integrated optical and optoelectronic devices, e.g., as optical switches, amplifiers, and interconnects.

V. Advantages and Improvements over Existing Techniques

The materials presented here have numerous advantages in comparison to currently available compounds and known materials.

i) First, for laser dye species included in inorganic-organic mesostructured solids, the block-copolymer species enable the introduction of highly dispersed organic dyes into these matrices in high concentrations (~1 wt %). Undesirable dimerization of dye molecules is strongly suppressed, resulting in thresholds for ASE that are 30 times lower/better than those of dye-included sol-gel $SiO_2$ glasses under otherwise identical conditions [Yang, P.; Wimsberger, G., et al, supra ].

ii) Second, these solid-state materials show very fast response times, comparable to those of dye species in liquid solutions.

iii) Third, in these hybrid materials, the dye species possess excellent long-term photostabilities, due to the low-thresholds and the hydrophobic character of the organic components. For example, as an optical fiber coating, a rhodamine-6G-doped mesostructured material could be optically pumped at 532 nm for 40,000 pulses, while still yielding output laser light.

iv) Furthermore, in combination with the above properties, the inorganic oxide network can impart enhanced mechanical and thermal stabilities (~150° C.) to the resulting transparent composite optical materials.

v) Moreover, dye species are incorporated into inorganic/block-copolymer mesophase or inorganic mesoporous materials via fast, easy, and versatile processing strategies, which allow the materials to be processed into different macroscopic shapes, as well as permitting high degrees of orientational ordering.

vi) Finally, it is possible to prepare transparent mesoporous solids with dye species that are covalently anchored during synthesis or post-synthetically adsorbed onto the mesostructure framework. The resulting mesoporous materials, which still possess the high degrees of transparency necessary for optical applications, are expected to be inexpensive, fast response sensors.

Collectively these materials provide new ways to produce complex multicomponent materials with synergistic combinations of optical and material properties for novel applications.

What is claimed is:

1. A method of forming transparent mesostructured host materials that include optical or redox responsive moieties comprising preparing a self-assembling system by dissolving an inorganic network precursor, and a block copolymer in a solvent to form a mesostructured composite, and adding an optically responsive agent to either the solvent or to the mesostructured composite.

2. The method of claim 1 further comprising polymerizing or crystallizing said inorganic network precursors to form an inorganic network within the mesostructured composite.

3. The method of claim 2 further comprising removing the block copolymer from the mesostructured composite to form a mesoporous solid.

4. The method of claim 3 wherein the block copolymer is removed by calcination or extraction.

5. The method of claim 2 wherein said inorganic network is an inorganic oxide selected from the group consisting of $Nb_2O_5$, $TiO_2$, $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, and $Al_2TiO_5$.

6. The method of claim 2 wherein the inorganic network is a metal oxynitride, metal oxychalcogenide, metal nitride, or metal chalcogenide.

7. The method of claim 1, further comprising covalently attaching the optically responsive agent directly to a functionalized component of the self assembling system or mesostructured composite, wherein said component is selected from the group consisting of a functionalized inorganic network precursor, a functionalized block copolymer and a functionalized inorganic network.

8. The method of claim 7, wherein the covalent attachment occurs either during or after self-assembly and inorganic network formation.

9. The method of claim 1 wherein said inorganic network precursor is a metal alkoxide.

10. The method of claim 1 wherein said inorganic network precursor is selected from the group consisting of tetraethoxysilane (TEOS), tetramethoxysilane (TMOS), and tetrapropoxysilane (TPOS).

11. The method of claim 1 wherein said block copolymer is an amphiphilic block copolymer.

12. The method of claim 1, said block copolymer comprising at least two different poly(alkylene oxide) blocks, wherein the alkylene oxide of one or more blocks has at least three carbon atoms.

13. The method of claim 1 wherein said block copolymer is a diblock, triblock, or star block copolymer.

14. The method of claim 1 wherein said block copolymer is is a poly(ethylene oxide)-poly(alkylene oxide)-poly(ethylene oxide) polymer where the alkylene oxide has at least three carbon atoms.

15. The method of claim 1, wherein said block copolymer is poly(ethyleneoxide)-poly(propyleneoxide)-poly(ethyleneoxide).

16. The method of claim 1 wherein said optically responsive agent is selected from the group consisting of lumiphores, chromophores, pH indicators, oxidation state indicators and chemically compatible combinations thereof.

17. The method of claim 1 wherein said optically responsive agent is present in the self assembling system at a concentration of about 0.10 wt % to about 10 wt %.

18. A method of forming an optically responsive mesostructured material, comprising:
   i) preparing a self-assembling system by dissolving an inorganic network precursor species, a block copolymer, and an optically responsive agent in a solvent; and
   ii) polymerizing or crystallizing said precursor species to form a mesostructured composite.

19. The method of claim 18 wherein said inorganic network precursor species is a metal alkoxide.

20. The method of claim 18 wherein said inorganic network precursor species is selected from the group consisting of tetraethoxysilane (TEOS), tetramethoxysilane (TMOS), and tetrapropoxysilane (TPOS).

21. The method of claim 18 wherein said inorganic network precursor species is an inorganic oxide selected from the group consisting of $Nb_2O_5$, $TiO_2$, $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, and $Al_2TiO_5$.

22. The method of claim 18 in which an inorganic network is formed within the mesostructured composite.

23. The method of claim 22 wherein the inorganic network is a metal oxynitride, metal oxychalcogenide, metal nitride, or metal chalcogenide.

24. The method of claim 18 wherein said block copolymer is an amphiphilic block copolymer.

25. The method of claim 18, said block copolymer comprising at least two different poly(alkylene oxide) blocks, wherein the alkylene oxide of one or more blocks has at least three carbon atoms.

26. The method of claim 18 wherein said block copolymer is a diblock, triblock, or star block copolymer.

27. The method of claim 18 wherein said block copolymer is is a poly(ethylene oxide)-poly(alkylene oxide)-poly(ethylene oxide) polymer where the alkylene oxide has at least three carbon atoms.

28. The method of claim 27, wherein said block copolymer is poly(ethyleneoxide)-poly(propyleneoxide)-poly(ethyleneoxide).

29. The method of claim 18 wherein said optically responsive agent is a moiety selected from the group consisting of lumiphores, chromophores, pH indicators, oxidation state indicators and chemically compatible combinations thereof.

30. The method of claim 18 wherein said optically responsive agent is present in the self assembling system at a concentration of about 0.10 wt % to about 10 wt %.

31. A method of forming a transparent mesoscopically structured material that includes an optical or redox responsive moiety, comprising:
  i) preparing a self-assembling system by dissolving an inorganic network precursor species and a block copolymer in a solvent;
  ii) polymerizing or crystallizing said precursor species to form a mesostructured composite, said composite comprising an inorganic network;
  iii) removing the block copolymer from the composite to form an inorganic network having mesopores; and
  iv) loading an optically responsive agent into the mesopores of the inorganic network.

32. The method of claim 31 wherein said loading is conducted by adsorption or ion exchange.

33. The method of claim 31 wherein said inorganic network precursor species is a metal alkoxide.

34. The method of claim 31 wherein said inorganic network precursor species is selected from the group consisting of tetraethoxysilane (TEOS), tetramethoxysilane (TMOS), and tetrapropoxysilane (TPOS).

35. The method of claim 31 wherein said inorganic network precursor species is an inorganic oxide selected from the group consisting of $Nb_2O_5$, $TiO_2$, $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, and $Al_2TiO_5$.

36. The method of claim 31 wherein the inorganic network is a metal oxynitride, metal oxychalcogenide, metal nitride, or metal chalcogenide.

37. The method of claim 30 wherein said block copolymer is an amphiphilic block copolymer.

38. The method of claim 31, said block copolymer comprising at least two different poly(alkylene oxide) blocks, wherein the alkylene oxide of one or more blocks has at least three carbon atoms.

39. The method of claim 31 wherein said block copolymer is a diblock, triblock, or star block copolymer.

40. The method of claim 31 wherein said block copolymer is is a poly(ethylene oxide)-poly(alkylene oxide)-poly(ethylene oxide) polymer where the alkylene oxide has at least three carbon atoms.

41. The method of claim 40, wherein said block copolymer is poly(ethyleneoxide)-poly(propyleneoxide)-poly(ethyleneoxide).

42. The method of claim 31 wherein said optically responsive agent is selected from the group consisting of lumiphores, chromophores, pH indicators, oxidation state indicators and chemically compatible combinations thereof.

43. The method of claim 31 wherein said optically responsive agent is present in the self assembling system at a concentration of about 0.10 wt % to about 10 wt %.

44. A method of forming a transparent mesoscopically structured material that includes an optical or redox responsive moiety, comprising:
  i) combining a functionalized inorganic network precursor having a reactive group with a functionalized optically responsive agent having a complementary reactive group to form a derivatized optically responsive agent, in which said optically responsive agent is covalently attached to said inorganic network precursor;
  ii) preparing a self-assembling system by dissolving a block copolymer; and the derivatized agent in a solvent; and
  iii) polymerizing or crystallizing said derivatized agent to form a mesostructured composite having an inorganic network wherein the optically responsive agent is covalently anchored to said inorganic network.

45. The method of claim 44 wherein said inorganic network precursor is a metal alkoxide.

46. The method of claim 44 wherein said inorganic network precursor is selected from the group consisting of tetraethoxysilane (TEOS), tetramethoxysilane (TMOS), and tetrapropoxysilane (TPOS).

47. The method of claim 44 wherein said inorganic network precursor is an inorganic oxide selected from the group consisting of $Nb_2O_5$, $TiO_2$, $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, and $Al_2TiO_5$.

48. The method of claim 44 the inorganic network percursor is a metal oxynitride, metal oxychalcogenide, metal nitride, or metal chalcogenide.

49. The method of claim 44 wherein said block copolymer is an amphiphilic block copolymer.

50. The method of claim 44, said block copolymer comprising at least two different poly(alkylene oxide) blocks, wherein the alkylene oxide of one or more blocks has at least three carbon atoms.

51. The method of claim 44 wherein said block copolymer is a diblock, triblock, or star block copolymer.

52. The method of claim 44 wherein said block copolymer is is a poly(ethylene oxide)-poly(alkylene oxide)-poly(ethylene oxide) polymer where the alkylene oxide has at least three carbon atoms.

53. The method of claim 52, wherein said block copolymer is poly(ethyleneoxide)-poly(propyleneoxide)-poly(ethyleneoxide).

54. The method of claim 44 wherein said functionalized optically responsive agent is selected from the group consisting of lumiphores, chromophores, pH indicators, oxidation state indicators and chemically compatible combinations thereof.

55. The method of claim 44 wherein said functionalized optically responsive agent is present in the self assembling system at a concentration of about 0.10 wt % to about 10 wt %.

56. An optically responsive mesescopically structured material comprising an inorganic framework, an amphiphilic block copolymer and an optically responsive agent.

57. The material of claim 56, said framework comprising an inorganic oxide.

58. The optically responsive mesoscopically structured material of claim 56 wherein the optically responsive agent is covalently attached to the block copolymer.

59. A microring laser device comprising an optical fiber and one or more layers of meostructured materials coating the fiber wherein at least one of said layers comprises the optically responsive mesoscopically structured material of claim 56.

60. The microring laser device of claim 59 further comprising a mesoporous support layer coating the optical fiber and an optically responsive layer coating the support layer, the optically responsive layer comprising the optically responsive mesoscopically structured material.

61. The microring laser of claim 59 wherein the mesoscopically structured material is chosen to exhibit amplified spontaneous emission.

62. A method of making a microring laser device comprising;
   i) coating an optical fiber with a first layer comprising a mesoscopically structured inorganic/block copolymer composite;
   ii) coating the first layer with a second layer comprising the optically responsive mesoscopically structured material of claim 56.

63. A waveguide device comprising a substrate, a mesoporous support layer deposited on the substrate, and a molded pattern on the support layer, said molded pattern comprising the optically responsive mesoscopically structured material of claim 56, said material having a refractive index greater than that of the support layer.

64. The waveguide device of claim 63 wherein the molded pattern is shaped as parallel or curved stripes.

65. The waveguide device of claim 63 wherein the refractive index of the mesoporous support is about 1.15–1.3.

66. The waveguide device of claim 63 wherein the mesoscopically structured material is chosen to exhibit amplified spontaneous emissions.

67. An optically responsive mesoporous material comprising a mesoporous inorganic framework having an optically responsive agent covalently attached to the framework.

68. The material of claim 67, said framework comprising an inorganic oxide.

69. An optically responsive mesoporous material comprising a mesoporous inorganic framework and an optically responsive agent adsorbed to the framework.

70. The material of claim 69, said framework comprising an inorganic oxide.

71. A solid state sensor device comprising a substrate layer and a sensing layer, said sensing layer comprising the optically responsive mesoporous material of claims 67 or 69.

72. The solid state sensor device of claim 71 in which the optically responsive material has a pH dependent photoluminescence response.

73. The solid state sensor device of claim 72, wherein the photoluminescence response occurs in less than about two seconds.

74. The solid state sensor device of claim 72 wherein the optically responsive agent is fluoroscein.

75. The solid state sensor device of claim 71 in which the optically responsive material has a gas dependent photoluminescence response.

76. The solid state sensor device of claim 75 wherein the device is an oxygen sensor.

77. The solid state sensor device of claim 76 wherein the optically responsive agent is $Ru(bipy)_3^{3+}$.

78. A method of forming an optically responsive mesoscopically structured material comprising:
   i) combining an amphiphilic block copolymer, an inorganic oxide precurser species and an optically responsive agent;
   ii) applying pressure to said combination, whereby the block copolymer and inorganic oxide precursor are self-assembled into a mesoscopically structured composite; and
   iii) polymerizing said inorganic oxide precursor species to form an inorganic oxide framework.

79. The method of claim 78 wherein pressure is applied to said combination by placing said combination on a substrate, placing a mold on said combination and applying said pressure to said mold.

80. The method of claim 79 wherein said mesoscopically structured composite forms channels aligned parallel to a plane of the substrate.

81. A method of forming an optically responsive mesoscopically structured material, comprising:
   i) contacting a mold, having a first open end and a second open end, with a substrate;
   ii) combining an amphiphilic block copolymer, an inorganic oxide precurser species and an optically responsive agent and
   iii) filling said mold with said combination by capillary flow from an open end whereby the block copolymer, inorganic oxide precursor species and optically responsive agent are self-assembled and polymerized into a mesoscopically structured composite.

82. The method of claim 81 wherein said mesocopically structured composite forms channels oriented in the direction of the capillary flow and aligned parallel to a plane of the substrate.

83. A method of making a waveguide, comprising:
   i) preparing a first self-assembling system by dissolving an inorganic oxide precursor and an amphiphilic block copolymer in an acidic solvent;
   ii) applying a film of the first self assembling system on a substrate;
   iii) polymerizing said inorganic oxide precursor of the first self assembling system to form a mesostructured composite;
   iv) removing the amphiphilic block copolymer to form a mesoporous support layer;
   v) preparing a second self-assembling system by dissolving an inorganic oxide precursor, an amphiphilic block copolymer, and an optically responsive agent in an acidic solvent;
   vi) molding the second self-assembling system into a waveguide pattern on the mesoporous support layer by soft lithography; and
   vii) polymerizing said precursor of the second self-assembling system to form an optically responsive mesostructured composite.

* * * * *